US010897210B2

(12) United States Patent
Murakami

(10) Patent No.: US 10,897,210 B2
(45) Date of Patent: Jan. 19, 2021

(54) DC/DC CONVERTER FOR REDUCING SWITCHING LOSS IN A CASE WHERE ZERO VOLTAGE SWITCHING IS NOT ACHIEVED

(71) Applicant: SHARP KABUSHIKI KAISHA, Sakai (JP)

(72) Inventor: Kohzaburoh Murakami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/616,472

(22) PCT Filed: Feb. 28, 2018

(86) PCT No.: PCT/JP2018/007537
§ 371 (c)(1),
(2) Date: Nov. 24, 2019

(87) PCT Pub. No.: WO2018/216294
PCT Pub. Date: Nov. 29, 2018

(65) Prior Publication Data
US 2020/0144926 A1    May 7, 2020

(30) Foreign Application Priority Data

May 25, 2017 (JP) ................................. 2017-103237
May 30, 2017 (JP) ................................. 2017-106969
Jun. 1, 2017  (JP) ................................. 2017-109280

(51) Int. Cl.
*H02M 3/335*     (2006.01)
*H02M 3/337*     (2006.01)
*H02M 1/00*      (2006.01)

(52) U.S. Cl.
CPC .............................. *H02M 3/33576* (2013.01)

(58) Field of Classification Search
CPC ..... H02M 3/335–33592; H02M 3/337; H02M 2001/0054
See application file for complete search history.

(56) References Cited

U.S. PATENT DOCUMENTS

2014/0254203 A1* 9/2014 Dai ...................... H02M 3/3353
363/17
2015/0263633 A1* 9/2015 Shono ............... H02M 3/33584
363/17

(Continued)

FOREIGN PATENT DOCUMENTS

JP        2014-087134 A    5/2014

OTHER PUBLICATIONS

Katsuya Hirachi, "DAB method Bidirectional DC/DC converter"; Hirachi Laboratory Technical Memorandum No. 20140310; Mar. 10, 2014, National Institute of Technology,Maizuru College; [Retrieved Apr. 18, 2017], Internet <URL: http://hirachi.cocolognifty.com/kh/files/20140310-1.pdf>.

*Primary Examiner* — Thienvu V Tran
*Assistant Examiner* — Sisay G Tiku
(74) *Attorney, Agent, or Firm* — ScienBiziP, P.C.

(57) ABSTRACT

A control unit 10 performs switching control of IGBTs 5a to 5d, 8b, and 8d, makes IGBTs 8a and 8c an OFF state, changes ON-duty of the IGBTs 5a to 5d, 8b, and 8d, and thereby adjusts first output power output from a secondary side converter 200. The IGBTs 5b, 5c, and 8b are synchronized together and switched in a prescribed cycle, and the IGBTs 5d and 8d are switched in a state where a phase is shifted by half a cycle with respect to the IGBTs 5b, 5c, and 8b (in a state where the phase is shifted by 180 degrees).

9 Claims, 19 Drawing Sheets

(56) References Cited

U.S. PATENT DOCUMENTS

| | | | |
|---|---|---|---|
| 2015/0381063 A1* | 12/2015 | Takahara | H02M 3/3376 363/17 |
| 2016/0156272 A1* | 6/2016 | Miura | H02M 3/33561 363/17 |
| 2017/0187297 A1* | 6/2017 | Narita | H02M 3/33584 |
| 2019/0190393 A1* | 6/2019 | Murakami | H02M 3/33561 |
| 2020/0021198 A1* | 1/2020 | Miyazaki | H02M 3/33569 |
| 2020/0266717 A1* | 8/2020 | Murakami | H02M 1/4208 |
| 2020/0274443 A1* | 8/2020 | Itogawa | H02M 3/33576 |

* cited by examiner t1<t<t2 t1<t<t3

DC/DC CONVERTER FOR REDUCING SWITCHING LOSS IN A CASE WHERE ZERO VOLTAGE SWITCHING IS NOT ACHIEVED

TECHNICAL FIELD

The present disclosure relates to a DC/DC converter.

BACKGROUND ART

For example, dual active bridge (DAB) type DC/DC converters are disclosed in PTL 1 and NPL 1.

CITATION LIST

Patent Literature

PTL 1: Japanese Unexamined Patent Application Publication No. 2014-87134

Non Patent Literature

NPL 1: Katsuya Hirachi, "Hirachi Laboratory Technology Memorandum No. 20140310 DAB type DC/DC converter, Mar. 10, 2014, National Institute of Technology, Maizuru College, [Retrieved Apr. 18, 2017], Internet <URL: http://hirachi.cocolog-nifty.com/kh/files/20140310-1.pdf>

SUMMARY OF INVENTION

Technical Problem

A DC/DC converter disclosed in PTL 1 gradually shortens a flyback period while repeating the flyback period and a power transmission period in a start and thereby realizes soft start. In the DC/DC converter disclosed in PTL 1, in a case where the flyback period is long, zero voltage switching (also referred to as ZVS hereinafter) is achieved in half of switching elements in a primary side switching circuit, and ZVS is not achieved in the remaining half switching elements. Further, because an equivalent voltage to an input voltage of the DC/DC converter is applied to the switching elements in which ZVS is not achieved, switching loss in the switching elements in which ZVS is not achieved is large.

NPL 1 discloses that perfect ZVS is possible in turning ON of a switching element. However, the disclosure does not assume a light load case. In a light load case, the magnetic excitation energy accumulated in a reactor connected with a switching element to be turned ON becomes low. Thus, extraction of the charge collected in a capacitor, which is connected in parallel with the switching element, by the magnetic excitation energy finishes before the charge collected in the capacitor runs out. In other words, in a light load case, ZVS is not achieved in turning ON of a switching element.

Further, it is understood from a timing diagram of a waveform and an operation mode of a reactor current, which is disclosed in NPL 1, that in a DC/DC converter disclosed in NPL 1, in each of a primary side full bridge and a secondary side full bridge, a pair of switching elements provided to one of opposite angles and a pair of switching elements provided to the other of opposite angles are alternately turned ON at 50% ON-duty in a fixed cycle except a period of dead time. Consequently, in a light load case, there may have been cases where ZVS is not achieved in all of eight switching elements that configure the primary side full bridge and the secondary side full bridge and switching loss becomes large.

In consideration of the above situation, an object of the present invention is to provide a DC/DC converter that may reduce switching loss in a case where zero voltage switching is not achieved.

Solution to Problem

To achieve the above object, a DC/DC converter according to one aspect of the present invention includes: a primary side converter that has a primary side reactor, plural primary side semiconductor switching elements, and plural primary side capacitors which are respectively connected in parallel with the plural primary side semiconductor switching elements; a transformer that has a primary winding and a secondary winding; a secondary side converter that has a secondary side reactor, plural secondary side semiconductor switching elements, and plural secondary side capacitors which are respectively connected in parallel with the plural secondary side semiconductor switching elements; and a control unit that controls the plural primary side semiconductor switching elements and the plural secondary side semiconductor switching elements. The primary side reactor is connected with the primary winding and/or is leakage inductance of the primary winding. The secondary side reactor is connected with the secondary winding and/or is leakage inductance of the secondary winding. The primary side converter and the secondary side converter each have a full bridge circuit. In a case where the control unit performs first control in which first output power is caused to be output from the secondary side converter, the control unit performs switching control of the primary side semiconductor switching element positioned on an upper side of a first arm of the primary side converter and the primary side semiconductor switching element positioned on a lower side of a second arm of the primary side converter such that turning ON periods are matched, performs switching control of the primary side semiconductor switching element positioned on a lower side of the first arm of the primary side converter and the primary side semiconductor switching element positioned on an upper side of the second arm of the primary side converter such that turning ON periods are matched, does not perform switching control of two switching elements positioned on one side between an upper side of first and second arms and a lower side of the first and second arms of the secondary side converter, performs switching control of one of the two secondary side semiconductor switching elements positioned on the other side between the upper side of the first and second arms and the lower side of the first and second arms of the secondary side converter such that a turning ON period matches the turning ON periods of the primary side semiconductor switching element positioned on the upper side of the first arm of the primary side converter and the primary side semiconductor switching element positioned on the lower side of the second arm of the primary side converter, and performs switching control of the other of the two secondary side semiconductor switching elements positioned on the other side between the upper side of the first and second arms and the lower side of the first and second arms of the secondary side converter such that a turning ON period matches the turning ON periods of the primary side semiconductor switching element positioned on the lower side of the first arm of the primary side converter and the primary side semiconductor switching element positioned on the upper side of the second arm of the primary side converter. The primary side semiconductor switching element positioned on the upper side of the first arm of the primary side converter is switched, at a prescribed phase difference, from the primary side semiconductor switching element positioned on the lower side of the first arm of the primary side converter, the prescribed phase difference is a shift of an angle, which corresponds to approximately ¼ of a reciprocal of a resonance frequency, from 180 degrees, the resonance frequency is defined by the primary side reactor and the primary side capacitors, and first output power output from the secondary side converter is adjusted by changing ON-duty of each piece of switching control to be conducted. In a case where the control unit performs second control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, does not perform switching control of two switching elements positioned on one side between the upper side of the first and second arms and the lower side of the first and second arms of the secondary side converter, performs switching control of the two secondary side semiconductor switching elements positioned on the other side between the upper side of the first and second arms and the lower side of the first and second arms of the secondary side converter such that phases of turning ON periods are shifted from phases of the turning ON periods of the four primary side semiconductor switching elements of the primary side converter, and adjusts second output power output from the secondary side converter by the shifts of phase while the ON-duty of each piece of switching control to be conducted is approximately 50%. The control unit simultaneously performs a decrease in the prescribed phase difference and an increase in the shift of phase in a case where the control unit performs switching from the first control to the second control.

Advantageous Effects of Invention

A DC/DC converter according to one aspect of the present invention may reduce switching loss in a case where zero voltage switching is not achieved.

DESCRIPTION OF EMBODIMENTS

Embodiments of the present invention will hereinafter be described with reference to drawings.

First Embodiment

Figure 1:
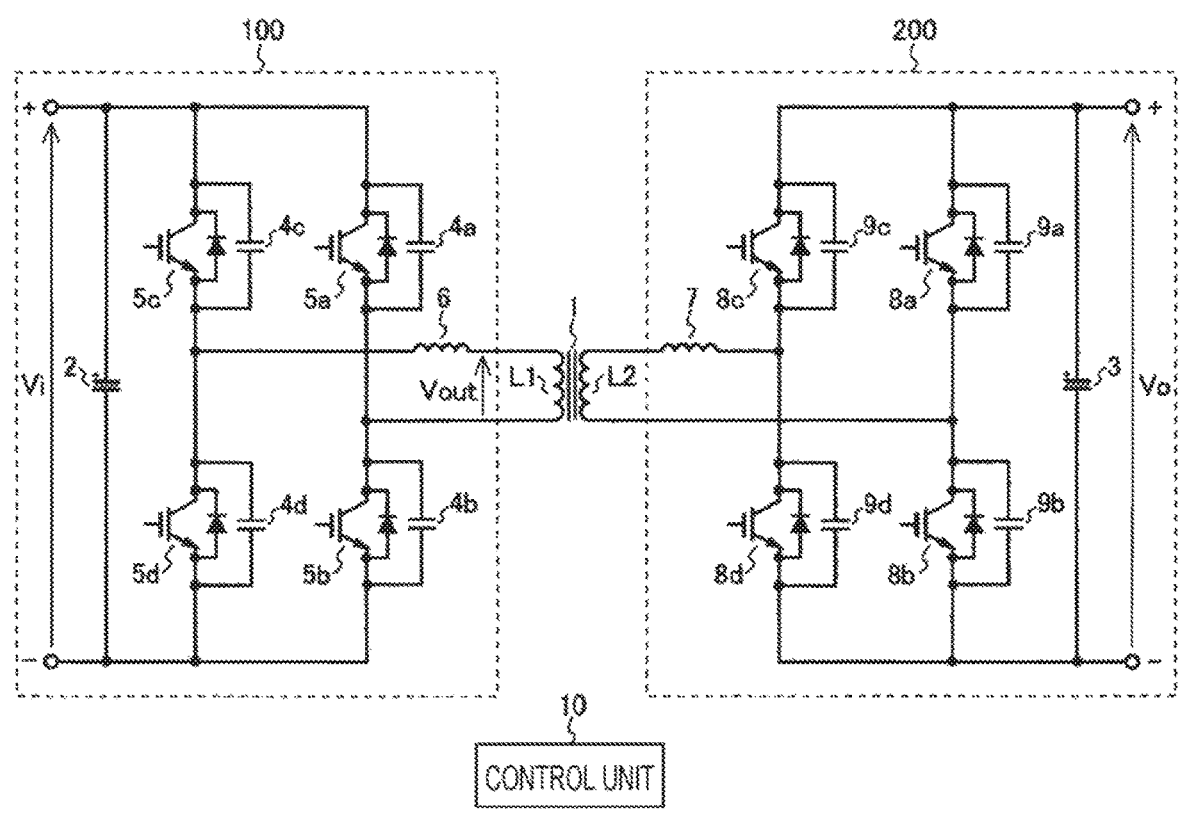
FIG. 1 is a diagram that illustrates an outline configuration of a DC/DC converter according to a first embodiment.

FIG. 1 is a diagram that illustrates an outline configuration of a DC/DC converter according to a first embodiment. The DC/DC converter according to this embodiment includes a transformer 1, a primary side converter 100, a secondary side converter 200, and a control unit 10. The primary side converter 100 is connected with a primary winding L1 of the transformer 1, and the secondary side converter 200 is connected with a secondary winding L2 of the transformer 1.

The primary side converter 100 includes capacitors 2 and 4a to 4d, insulated gate bipolar transistors (IGBTs) 5a to 5d, and a reactor 6. Diodes are connected in parallel with the IGBTs 5a to 5d in respective reverse directions. Further, the capacitors 4a to 4d are respectively connected in parallel with the IGBTs 5a to 5d. The IGBT 5a and the IGBT 5b are connected together in series, a collector of the IGBT 5a is connected with the positive electrode side of the capacitor 2, and an emitter of the IGBT 5b is connected with the negative electrode side of the capacitor 2. Similarly, the IGBT 5c and the IGBT 5d are connected together in series, a collector of the IGBT 5c is connected with the positive electrode side of the capacitor 2, and an emitter of the IGBT 5d is connected with the negative electrode side of the capacitor 2. A connection node between the IGBT 5c and the IGBT 5d is connected with one end of the primary winding L1 via the reactor 6, and a connection node between the IGBT 5a and the IGBT 5b is connected with the other end of the primary winding L1. As the reactor 6, for example, a coil may be used, leakage inductance of the primary winding L1 may be used, and both of a coil and the leakage inductance of the primary winding L1 may be used.

The secondary side converter 200 includes capacitors 3 and 9a to 9d, IGBTs 8a to 8d, and a reactor 7. Diodes are connected in parallel with the IGBTs 8a to 8d in respective reverse directions. Further, the capacitors 9a to 9d are respectively connected in parallel with the IGBTs 8a to 8d. The IGBT 8a and the IGBT 8b are connected together in series, a collector of the IGBT 8a is connected with the positive electrode side of the capacitor 3, and an emitter of the IGBT 8b is connected with the negative electrode side of the capacitor 3. Similarly, the IGBT 8c and the IGBT 8d are connected together in series, a collector of the IGBT 8c is connected with the positive electrode side of the capacitor 3, and an emitter of the IGBT 8d is connected with the negative electrode side of the capacitor 3. A connection node between the IGBT 8c and the IGBT 8d is connected with one end of the secondary winding L2 via the reactor 7, and a connection node between the IGBT 8a and the IGBT 8b is connected with the other end of the secondary winding L2. As the reactor 7, for example, a coil may be used, the leakage inductance of the secondary winding L2 may be used, and both of a coil and the leakage inductance of the secondary winding L2 may be used.

The control unit 10 respectively supplies gate signals to the IGBTs 5a to 5d and 8a to 8d and thereby controls respective states of the IGBTs 5a to 5d and 8a to 8d. In this embodiment, the control unit 10 performs switching control of the IGBTs 5a to 5d, 8b, and 8d, makes the IGBTs 8a and 8c an OFF state, changes ON-duty of the IGBTs 5a to 5d, 8b, and 8d, and thereby performs first control for adjusting first output power output from the secondary side converter 200.

Figure 2:
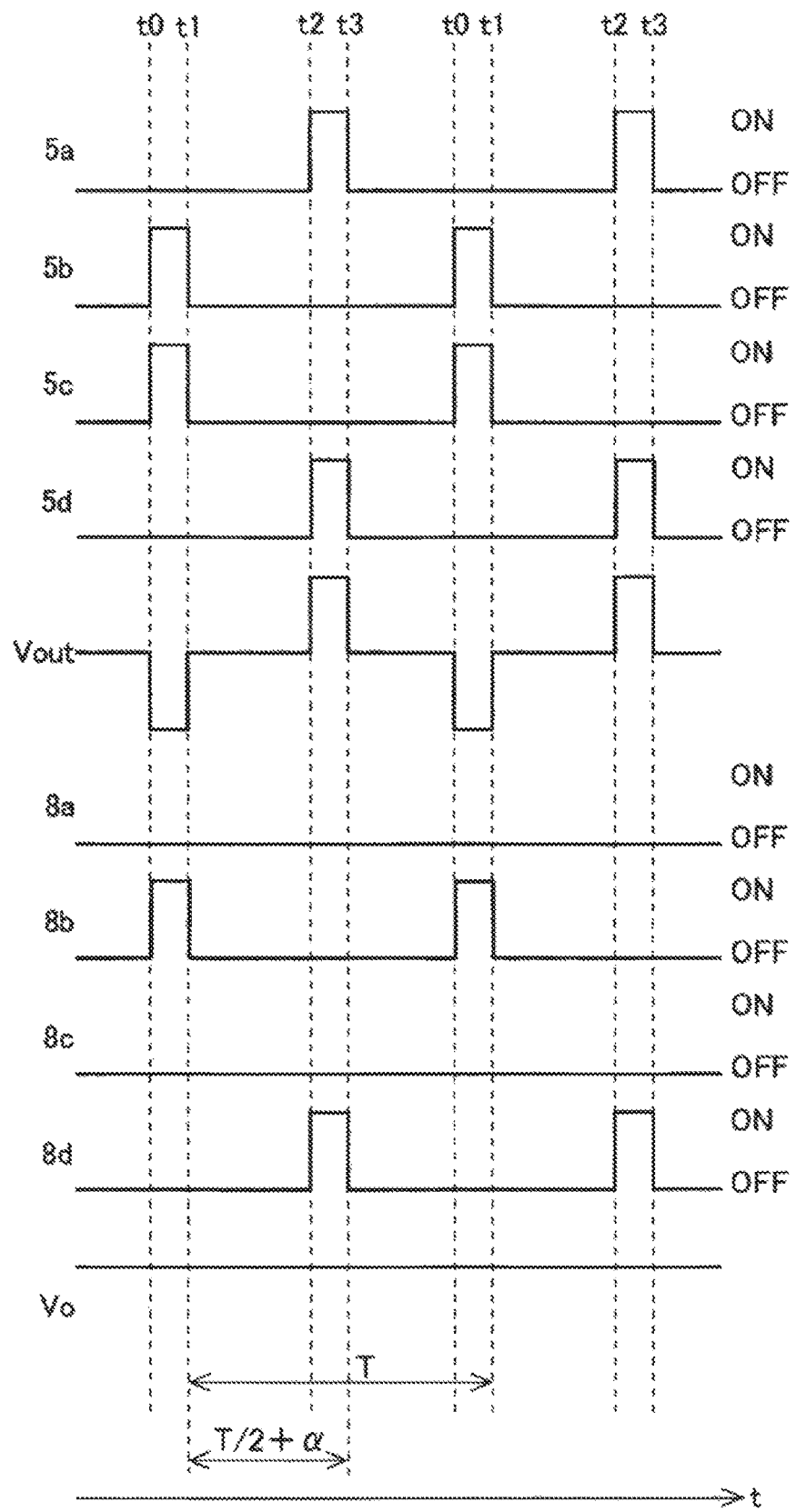
FIG. 2 is a timing diagram that illustrates states of IGBTs and output voltage waveforms of primary and secondary side converters.

FIG. 2 is a timing diagram that illustrates states of the IGBTs, a waveform of an output voltage Vout of the primary side converter 100, and a waveform of an output voltage Vo of the secondary side converter 200. The IGBTs 5b, 5c, and 8b are synchronized together and switched in a cycle T, and the IGBTs 5a, 5d, and 8d are switched at a prescribed phase difference (the phase difference that corresponds to T/2+α in FIG. 2) with respect to the IGBTs 5b, 5c, and 8b. The prescribed phase difference is a shift of an angle, which corresponds to approximately ¼ of the reciprocal of a resonance frequency, from 180 degrees. The resonance frequency is defined by a circuit constant of the primary side converter 100.

Figure 3:
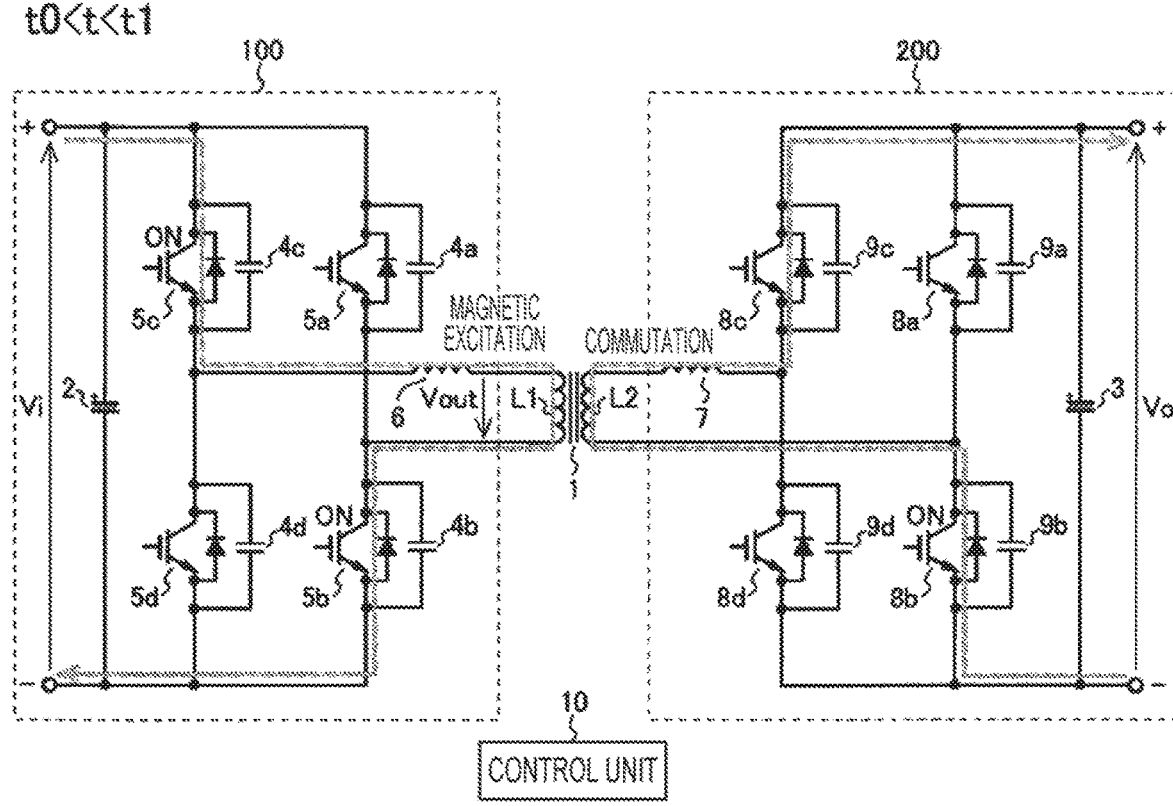
FIG. 3 is a diagram for explaining an operation of the DC/DC converter according to the first embodiment.

In a case where time t is t0<t<t1, because the IGBTs 5b and 5c are in an ON state as illustrated in FIG. 2, a current flows in the primary side converter 100 in an order of the IGBT 5c→the reactor 6→the primary winding L1 of the transformer 1→the IGBT 5b as illustrated in FIG. 3. Accordingly, electromotive force is generated in the secondary winding L2 of the transformer 1, and a current flows in the secondary side converter 200 in an order of the IGBT 8b→the secondary winding L2 of the transformer 1→the reactor 7→the IGBT 8c as illustrated in FIG. 3.

Figure 4:
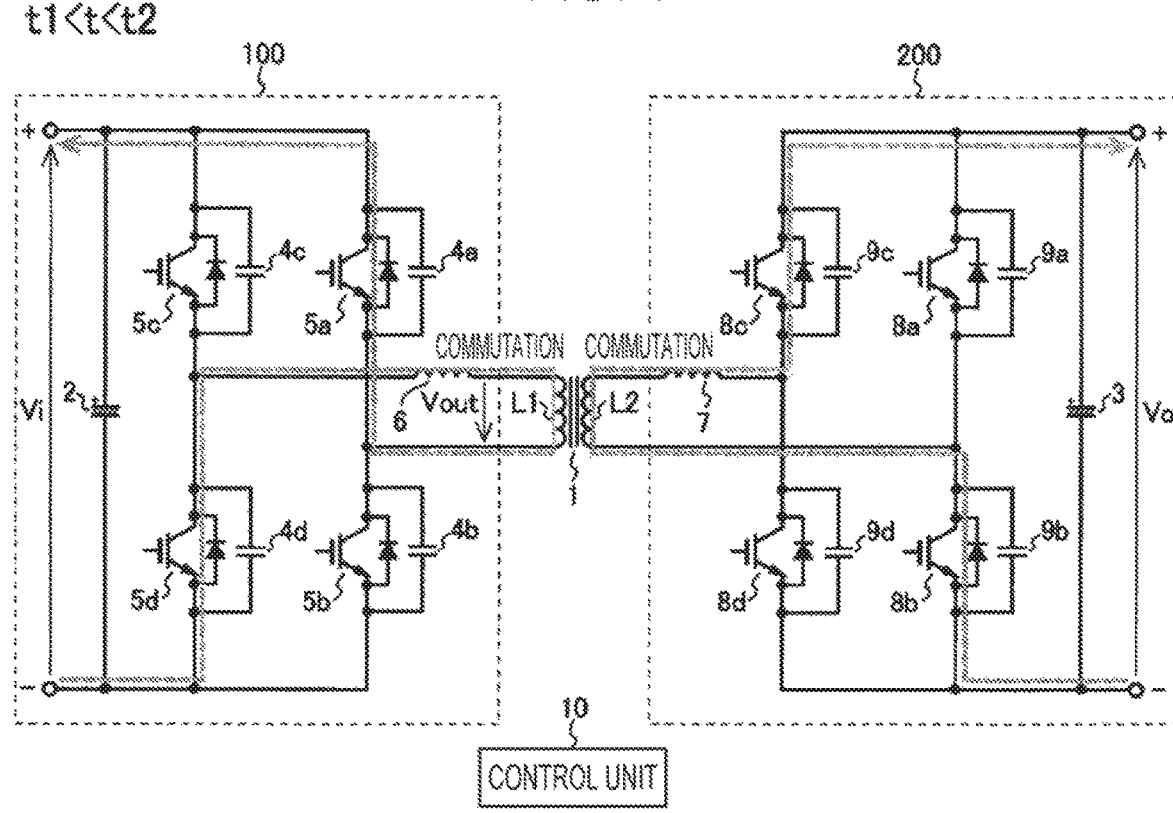
FIG. 4 is a diagram for explaining the operation of the DC/DC converter according to the first embodiment.
Figure 5:
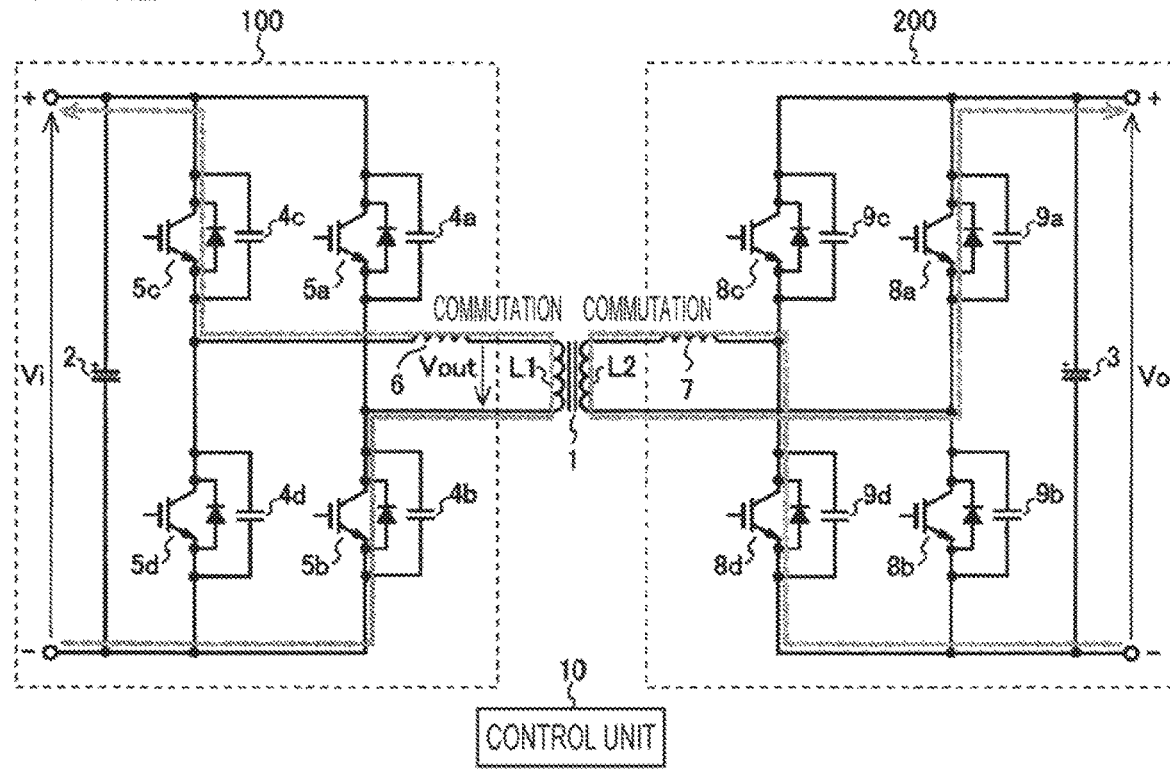
FIG. 5 is a diagram for explaining the operation of the DC/DC converter according to the first embodiment.

In a case where time t is t1<t<t2, all the IGBTs 5a to 5d and 8a to 8d become the OFF state as illustrated in FIG. 2. However, electromotive force is generated in the reactors 6 and 7 in directions for maintaining the current, magnetic excitation energy stored in the reactor 6 is fed back to an input end in the primary side converter 100 while electric oscillation is repeated (the state illustrated in FIG. 4 and the state illustrated in FIG. 5 are alternately repeated), and magnetic excitation energy stored in the reactor 7 is supplied to an output end in the secondary side converter 200. A feedback operation in the primary side converter 100 is continued until the magnetic excitation energy of the reactor 6 becomes zero, and a supply operation in the secondary side converter 200 is continued until the magnetic excitation energy of the reactor 7 becomes zero.

In a case where the magnetic excitation energy of each of the reactors 6 and 7 is zero and the electric oscillation stops at a timing when time t becomes t=t2, there occurs a state where a voltage of Vi/2 is applied between the collector and the emitter of each of the IGBTs 5a to 5d and a voltage of Vo/2 is applied between the collector and the emitter of each of the IGBTs 8a to 8d. In this state, in a case where the IGBTs 5a, 5d, and 8d are turned ON as illustrated in FIG. 2, charges accumulated in the capacitors 4a, 4d, and 9d that are respectively connected in parallel with the IGBTs 5a, 5d, and 8d are consumed due to a short circuit.

In a case where the magnetic excitation energy of at least one of the reactors 6 and 7 is not zero at the timing when time t becomes t=t2, there occurs a state where a voltage of zero or higher and Vi or lower is applied between the collector and the emitter of each of the IGBTs 5a to 5d and a voltage of zero or higher and Vo or lower is applied between the collector and the emitter of each of the IGBTs 8a to 8d.

In a case where time t is t2<t<t3, due to symmetry of a full bridge circuit, the same operation as a case where time t is t0<t<t1 is performed, in which only the combination of the IGBTs to become the ON state is different. Thus, a description will not be made.

Figure 6:
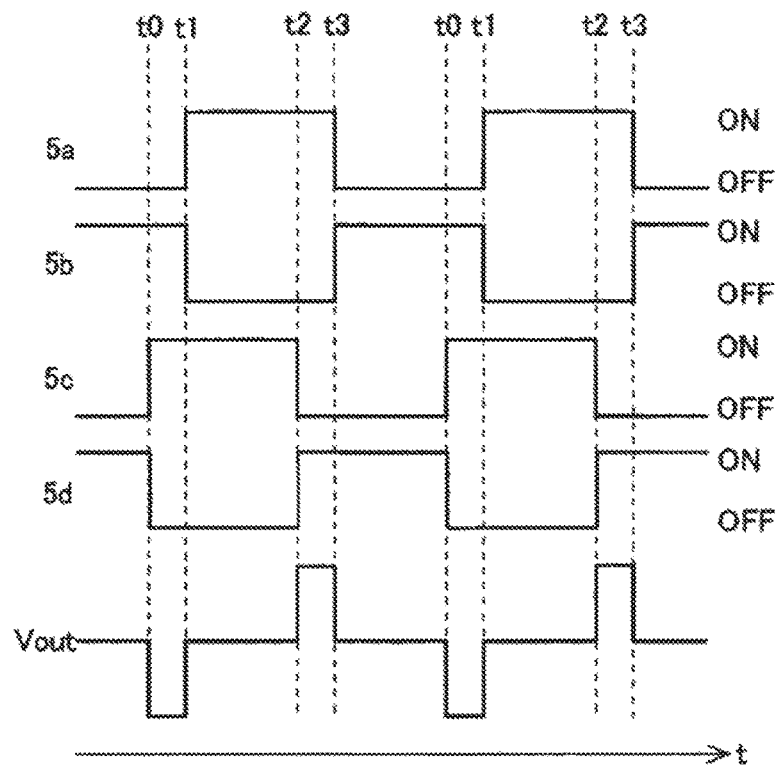
FIG. 6 is a timing diagram that illustrates a sequence of a comparative example.

Here, as a comparative example, a description will be made about a case where a similar sequence to PTL 1 is performed. FIG. 6 is a timing diagram that illustrates states of the IGBTs 5a to 5d and a waveform of the output voltage Vout of the primary side converter 100 in a case where a similar sequence to PTL 1 is performed.

In the sequence illustrated in FIG. 6, because current resonance in a case where time t is t0<t<t1 is used, ZVS in turning ON of the IGBT 5a is achieved and because current resonance in a case where time t is t2<t<t3 is used, ZVS in turning ON of the IGBT 5b is achieved. However, because current resonance may not be used in turning ON of the IGBT 5c before t0<t<t1 and in turning ON of the IGBT 5d before t2<t<t3, ZVS is not achieved.

Consequently, in the sequence illustrated in FIG. 6, in four pieces of turning ON of the IGBTs 5a to 5d in one cycle, ZVS is achieved in two pieces of turning ON, but ZVS is not achieved in the remaining two pieces of turning ON.

In the turning ON of the IGBT 5c in which ZVS is not achieved, considering a situation in which the IGBTs 5b and 5d are in the ON state immediately before the IGBT 5c is turned ON, the voltage applied between the collector and the emitter of the IGBT 5c is estimated to be equivalent to an input voltage Vi. Thus, a charge Q accumulated in the capacitor 4c in turning ON of the IGBT 5c is Q=Vi×C, and energy E consumed due to non-achievement of ZVS is estimated to be E=0.5×C×Vi$^2$. Here, C is a capacitance of each of the capacitors 4a to 4d.

Because similar energy consumption occurs in turning ON of the IGBT 5d, the switching loss related to non-achievement of ZVS in one cycle is estimated to be C×Vi$^2$.

On the other hand, in a sequence of this embodiment, that is, a sequence illustrated in FIG. 2, the IGBTs 5a and 5d are turned ON after time elapses from the time t that is t0<t<t1, and the IGBTs 5b and 5c are turned ON after time elapses from the time t that is t2<t<t3. Consequently, because current resonance may not be used in turning ON of each of the IGBTs 5a to 5d, ZVS is not achieved.

The voltage applied between the collector and the emitter of the IGBT 5d in turning ON of the IGBT 5d is 0.5×Vi because the input voltage Vi is shared by the IGBT 5c and the IGBT 5d. Consequently, a charge Q' accumulated in the capacitor 4d in turning ON of the IGBT 5d is Q'=0.5×Vi×C, and energy E' consumed due to non-achievement of ZVS is estimated to be E'=0.5×C×(0.5×Vi)$^2$.

Because similar energy consumption occurs in turning ON of the IGBTs 5a to 5d, the switching loss related to non-achievement of ZVS in one cycle is estimated to be 4×0.5×C×(0.5×Vi)$^2$, that is, 0.5×C×Vi$^2$.

As it is clear from the above discussion, in the sequence of this embodiment, that is, the sequence illustrated in FIG. 2, the switching loss related to non-achievement of ZVS in one cycle becomes half compared to the sequence of the comparative example, that is, the sequence illustrated in FIG. 6.

Further, considering that ZVS is not achieved in four locations (the IGBTs 5a to 5d) in one cycle in the sequence of this embodiment and ZVS is not achieved in two locations (the IGBTs 5c and 5d) in one cycle in the sequence of the comparative example, in the sequence of this embodiment, the switching loss for one location becomes ¼ compared to the sequence of the comparative example. Consequently, in the sequence of this embodiment, a local temperature rise due to the switching loss may be suppressed compared to the sequence of the comparative example.

Figure 7:
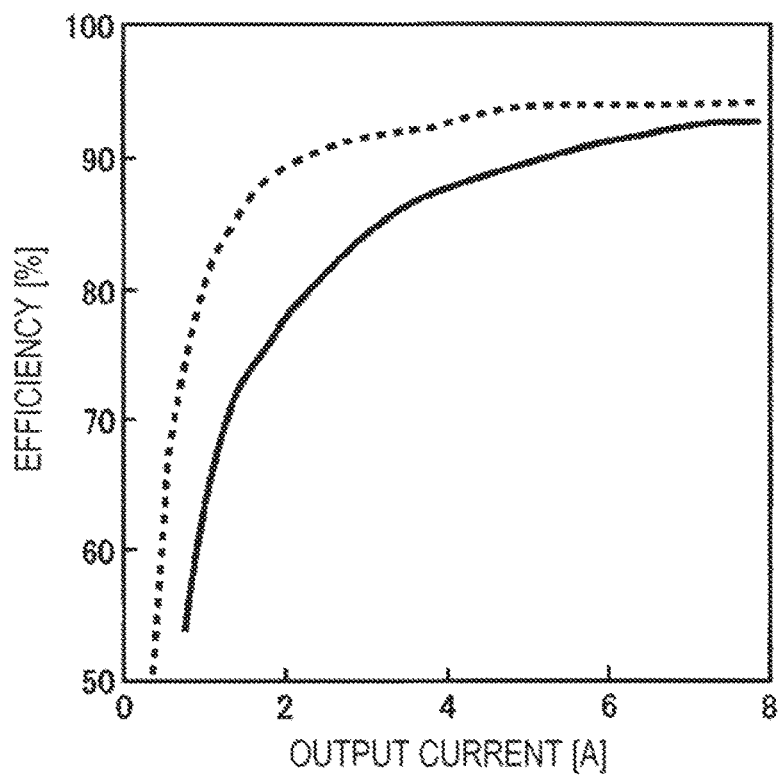
FIG. 7 is a diagram that illustrates efficiency characteristics of the DC/DC converter according to the first embodiment and the comparative example.

FIG. 7 is a diagram that illustrates an efficiency characteristic (the dotted line in FIG. 7) in the sequence of this embodiment and an efficiency characteristic (the solid line in FIG. 7) in the sequence of the comparative example. Because the switching loss related to non-achievement of ZVS is small in the sequence of this embodiment compared to the sequence of the comparative example, the efficiency becomes high as a result.

Figure 8A:
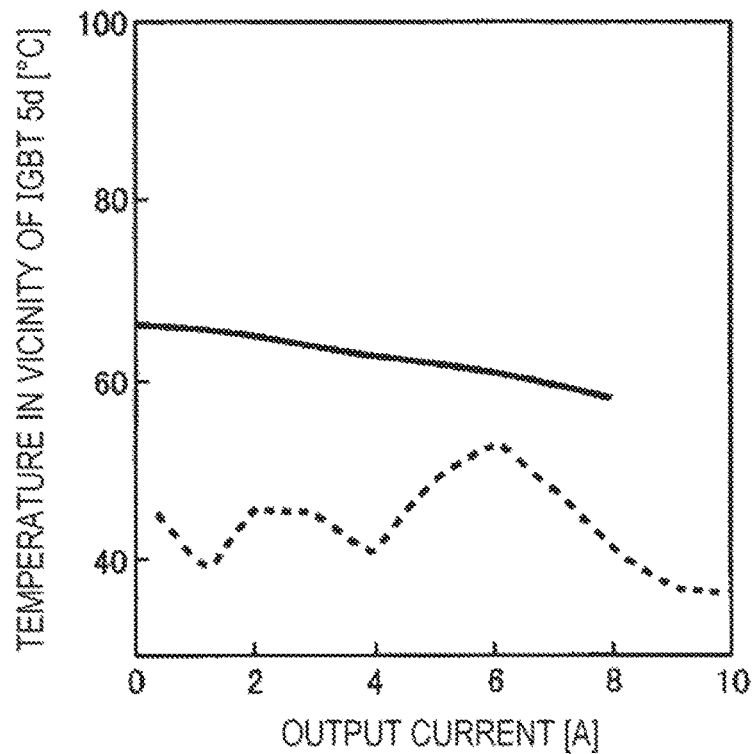
FIG. 8A is a diagram that illustrates temperature characteristics of the DC/DC converter according to the first embodiment and the comparative example.

FIG. 8A is a diagram that illustrates a temperature characteristic (the dotted line in FIG. 8A) in the vicinity of the IGBT 5d in the sequence of this embodiment and a temperature characteristic (the solid line in FIG. 8A) in the vicinity of the IGBT 5d in the sequence of the comparative example. A temperature rise in the vicinity of the IGBT 5d may be suppressed in the sequence of this embodiment compared to the sequence of the comparative example. Temperature characteristics in the vicinities of the IGBTs, in which ZVS is not achieved, other than the IGBT 5d are similar to the temperature characteristic in the vicinity of the IGBT 5d.

Note that the above-described first control is directly switched to control in which control for the primary side converter 100 and control for the secondary side converter 200 in the first control are interchanged with each other, and power transmission from the primary side converter 100 to the secondary side converter 200 may thereby be switched to power transmission from the secondary side converter 200 to the primary side converter 100. Accordingly, while the switching loss related to non-achievement of ZVS is maintained small, directions of power transmission may seamlessly be switched.

Figure 8B:
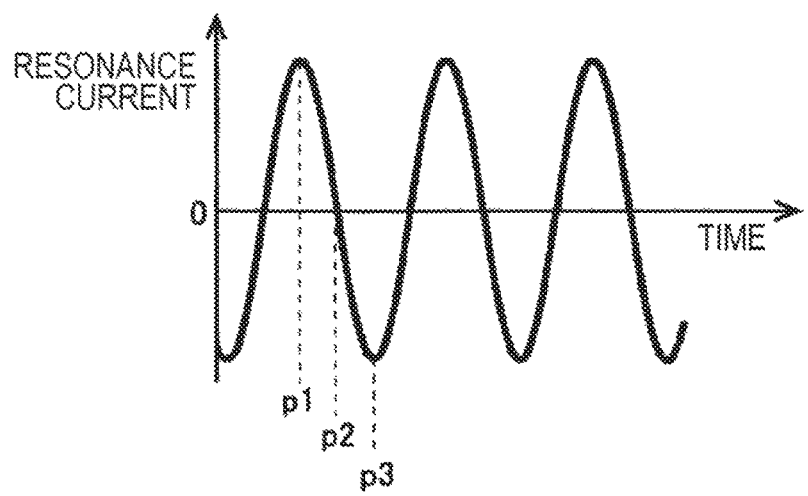
FIG. 8B is a timing diagram that illustrates a resonance current waveform.

Next, a description will be made about an influence on output power caused by resonance current. In a period in which time t in the sequence illustrated in FIG. 6 is t1<t<t2, a resonance current illustrated in FIG. 8B flows through the transformer 1. In a section in which the resonance current is positive, ZVS is achieved in a case where the IGBTs 5a and 5d are turned ON. In a section in which the resonance current is negative, ZVS is achieved in a case where the IGBTs 5c and 5b are turned ON.

Figure 8C:
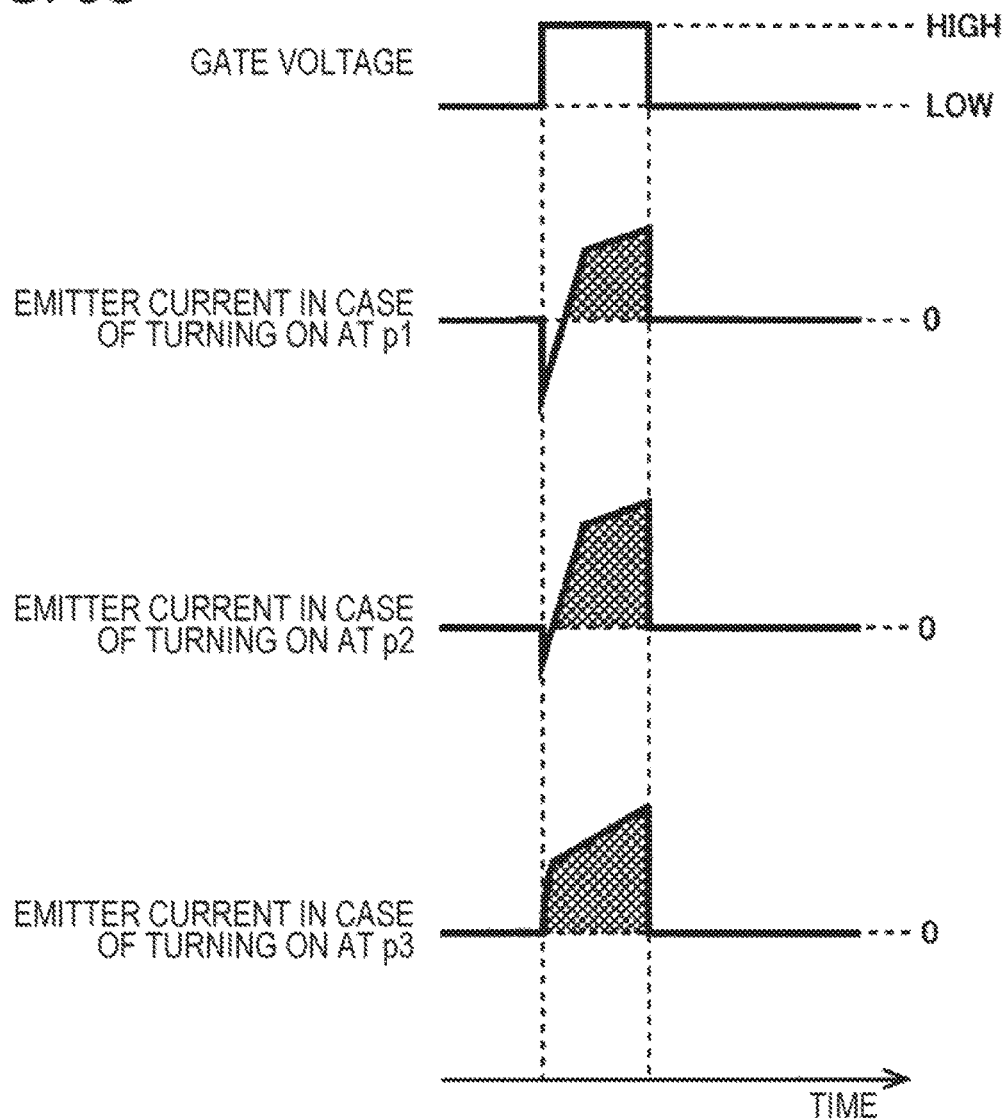
FIG. 8C is a timing diagram that illustrates a gate voltage waveform and emitter current waveforms of the IGBTs.

The output power of the DC/DC converter according to this embodiment increases or decreases in response to the magnitude of resonance current at a timing when time t becomes t=t2. For example, considering a case where the IGBTs 5a and 5d are turned ON at timings of p1, p2, and p3 indicated in FIG. 8B, the magnitudes of emitter currents of the IGBTs 5a and 5d are different among timings p1, p2, and p3 at which the IGBTs 5a and 5d are turned ON as illustrated in FIG. 8C. Thus, the total amount of the emitter currents that flow until the IGBTs 5a and 5d are turned OFF (hatched portions indicated in FIG. 8C) largely changes in accordance with the timing at which the IGBTs 5a and 5d are turned ON.

Further, the output power of the DC/DC converter according to this embodiment in a period in which the IGBTs 5a and 5d are in the ON state is proportional to the total amount of the emitter currents that flow after the IGBTs 5a and 5d are turned ON until those are turned OFF and thus largely changes in accordance with the timing at which the IGBTs 5a and 5d are turned ON. Similarly, the output power of the DC/DC converter according to this embodiment in a period in which the IGBTs 5c and 5b are in the ON state is proportional to the total amount of the emitter currents that flow after the IGBTs 5c and 5b are turned ON until those are turned OFF and thus largely changes in accordance with the timing at which the IGBTs 5b and 5c are turned ON.

Figure 8D:
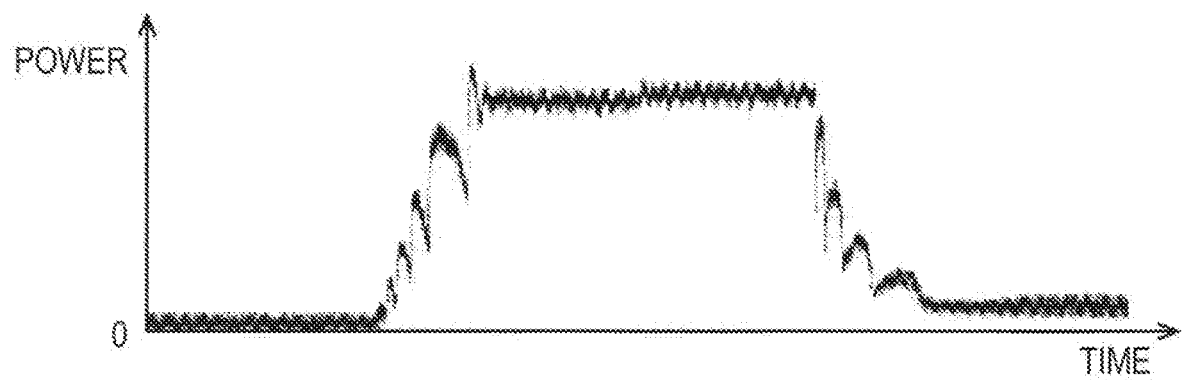
FIG. 8D is a timing diagram that illustrates an output power waveform of a DC/DC converter according to a first reference example.

Here, a DC/DC converter, which is different compared to that of this embodiment only in a point that the IGBTs 5a, 5d, and 8d are switched in a state where the phase is shifted by half a cycle with respect to the IGBTs 5b, 5c, and 8b (in a state where the phase is shifted by 180 degrees), is raised as a first reference example. In the first reference example, for example, if the IGBTs 5a and 5d are turned ON at a timing of a crest of resonance current (at the timing of p1 indicated in FIG. 8B), the IGBTs 5c and 5b are also turned ON at a timing of a crest of resonance current. That is, in the first reference example, the timing at which the IGBTs 5a and 5d are turned ON and the timing at which the IGBTs 5c and 5b are turned ON are in the same phase with respect to the cycle of resonance frequency. Consequently, in the first reference example, in a case where the width of ON-duty increases or decreases at a certain change rate, the phase of the timing at which the IGBTs 5a to 5d are turned ON with respect to the cycle of resonance frequency fluctuates uniformly and periodically. Thus, in the first reference example, a periodic fluctuation of the output voltage, which appears in response to increases and decreases in the ON-duty in a light load case, becomes large as illustrated in FIG. 8D.

Figure 8E:
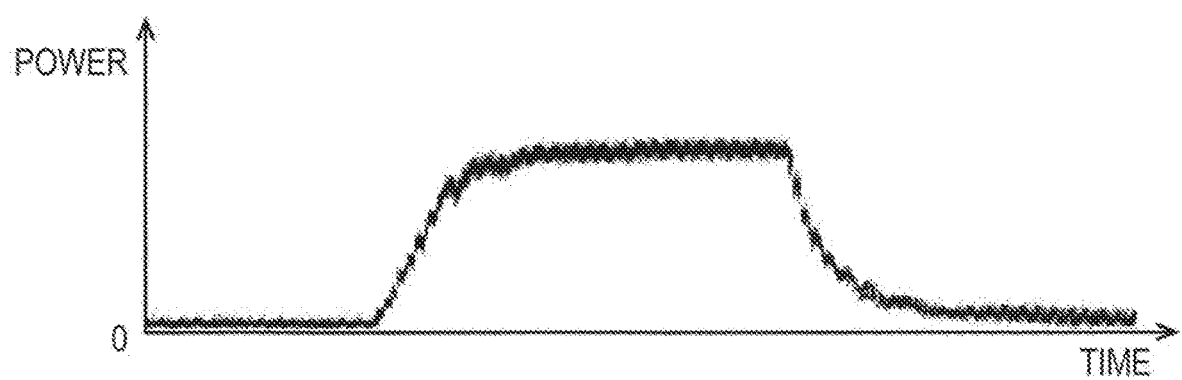
FIG. 8E is a timing diagram that illustrates an output power waveform of the DC/DC converter according to the first embodiment.

On the other hand, in this embodiment, as descried above, the IGBTs 5a, 5d, and 8d are switched at a prescribed phase difference (the phase difference that corresponds to T/2+α in FIG. 2) with respect to the IGBTs 5b, 5c, and 8b. The prescribed phase difference is a shift of an angle, which corresponds to approximately ¼ of the reciprocal of a resonance frequency, from 180 degrees. Consequently, in this embodiment, for example, if the IGBTs 5a and 5d are turned ON at a timing of a crest of resonance current (at the timing of p1 indicated in FIG. 8B), the IGBTs 5c and 5b are turned ON at a timing of a trough of resonance current (at the timing of p3 indicated in FIG. 8B). Accordingly, in this embodiment, an influence of the phase of the timing at which the IGBTs 5a and 5d are turned ON with respect to the cycle of resonance frequency on an output power characteristic may be canceled by an influence of the phase of the timing at which the IGBTs 5c and 5b are turned ON with respect to the cycle of resonance frequency on the output power characteristic. Thus, in this embodiment, the periodic fluctuation of the output voltage, which appears in response to increases and decreases in the ON-duty in a light load case, becomes small as illustrated in FIG. 8E.

Note that α in FIG. 2 ideally becomes ¼ of the reciprocal of a resonance frequency but does not have to be strictly set to ¼ of the reciprocal of a resonance frequency. For example, a value at which the periodic fluctuation in the output voltage which appears in response to increases and decreases in the ON-duty in a light load case becomes smallest may be obtained by an examination or a simulation, and the obtained value may be set.

In addition, the control unit 10 in this embodiment may perform direct switching from the first control to second control and may perform direct switching from the second control to the first control.

Figure 9:
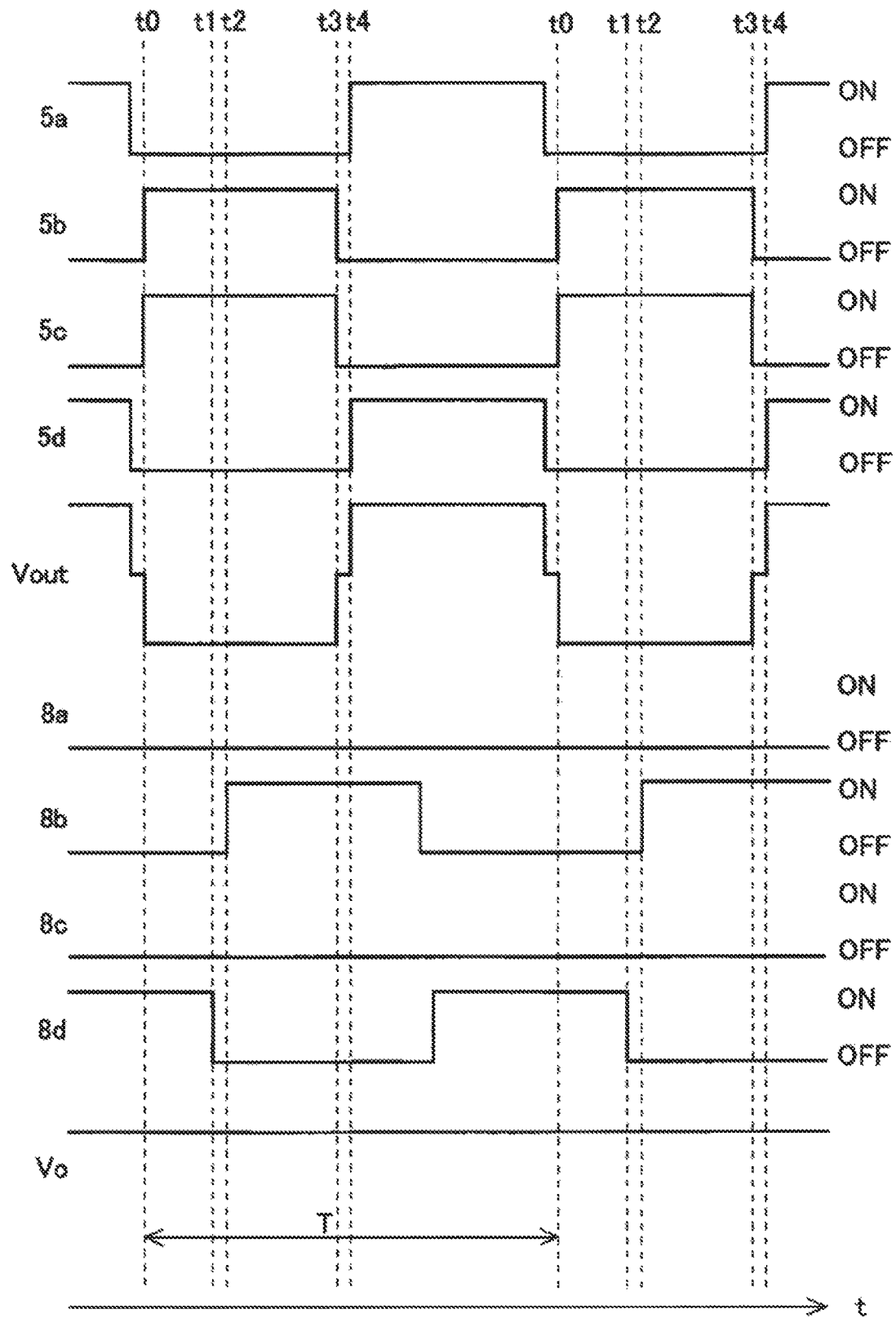
FIG. 9 is a timing diagram that illustrates states of the IGBTs and output voltage waveforms of the primary and secondary side converters.

FIG. 9 is a timing diagram that illustrates states of the IGBTs, a waveform of the output voltage Vout of the primary side converter 100, and a waveform of the output voltage Vo of the secondary side converter 200 in a case where the control unit 10 performs the second control. The IGBTs 5b and 5c and the IGBTs 5a and 5d are complementarily tuned ON and OFF except dead time. The ON-duty of the IGBTs 5a to 5d is considered to be 50% if dead time is excepted. The IGBT 8b is switched in a state where the phase is shifted with respect to the IGBTs 5b and 5c, and the IGBT 8d is switched in a state where the phase is shifted with respect to the IGBTs 5a and 5d. The ON-duty of the IGBTs 8b and 8d is also considered to be 50% if dead time is excepted. In the second control, the above shift amount of phase is changed, and second output power output from the secondary side converter 200 is thereby adjusted.

Figure 10:
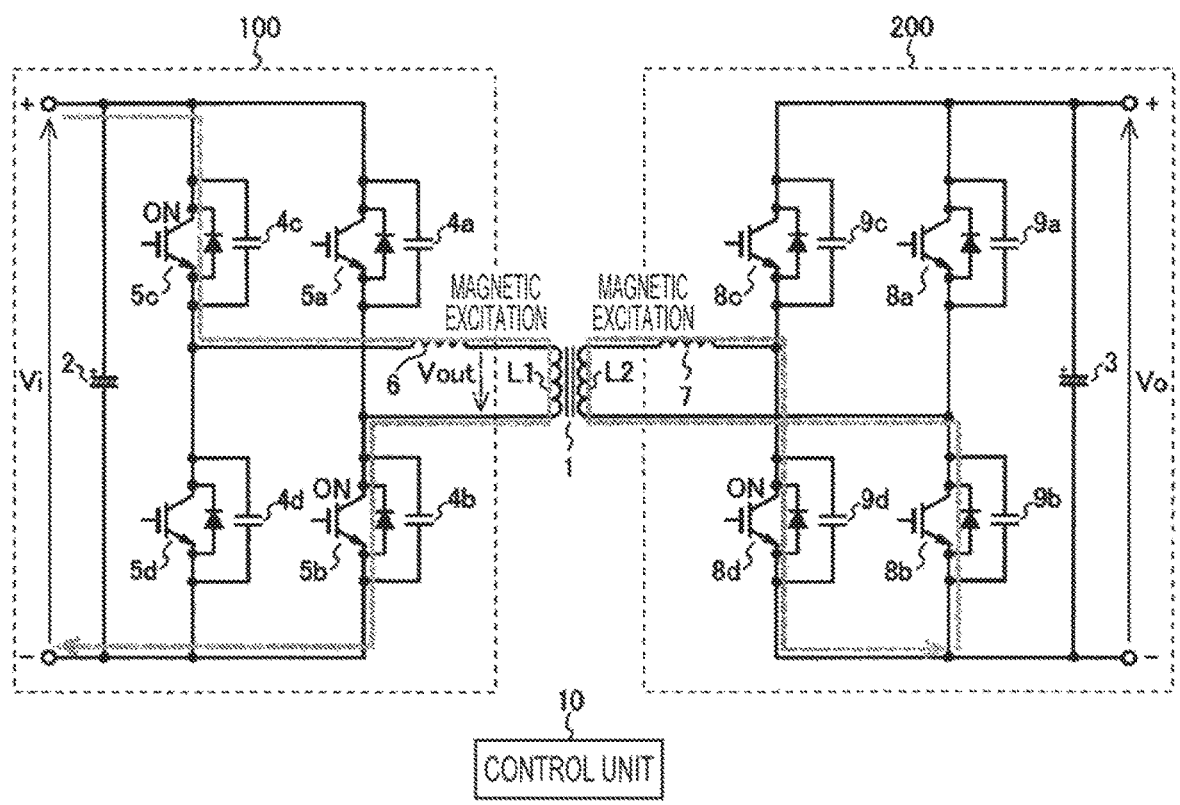
FIG. 10 is a diagram for explaining an operation of the DC/DC converter according to the first embodiment.

In a case where time t is t0<t<t1, because the IGBTs 5b and 5c are in the ON state as illustrated in FIG. 9, a current flows in the primary side converter 100 in an order of the IGBT 5c→the reactor 6→the primary winding L1 of the transformer 1→the IGBT 5b as illustrated in FIG. 10. Accordingly, because electromotive force is generated in the secondary winding L2 of the transformer 1 and the IGBT 8d is in the ON state as illustrated in FIG. 9, a current flows in the secondary side converter 200 in an order of the IGBT 8b→the secondary winding L2 of the transformer 1→the reactor 7→the IGBT 8d as illustrated in FIG. 10.

Figure 11:
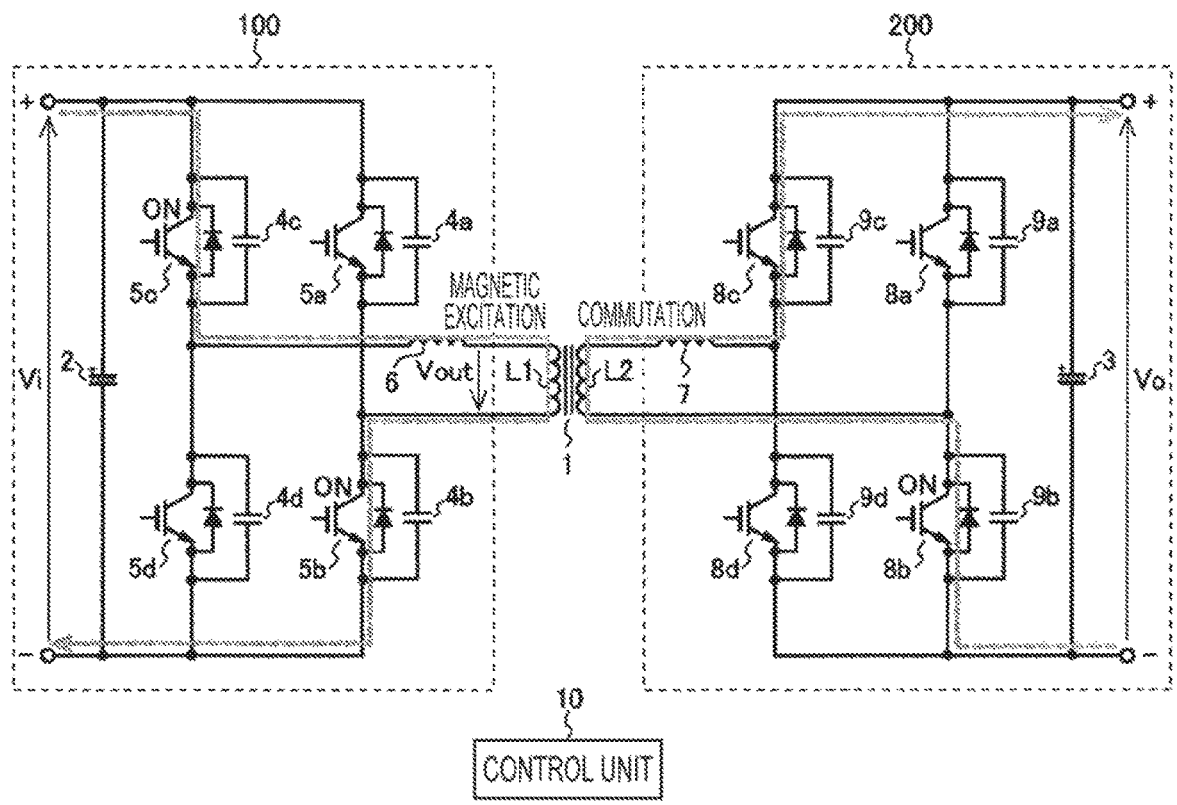
FIG. 11 is a diagram for explaining the operation of the DC/DC converter according to the first embodiment.

In a case where time t is t1<t<t3, because the IGBT 8d is turned OFF at a timing at which time t becomes t=t1 and the IGBT 8b is thereafter turned ON at a timing at which time t becomes t=t2, a current flows in the secondary side converter 200 in an order of the IGBT 8b→the secondary winding L2 of the transformer 1→the reactor 7→the IGBT 8c as illustrated in FIG. 11. In this case, in the secondary winding L2 of the transformer 1, electromotive force induced by the current that flows through the primary side converter 100 is present, and electromotive force in commutation at the reactor 7 is piled up in addition. Accordingly, the output voltage Vo of the secondary side converter 200 is boosted.

Figure 12:
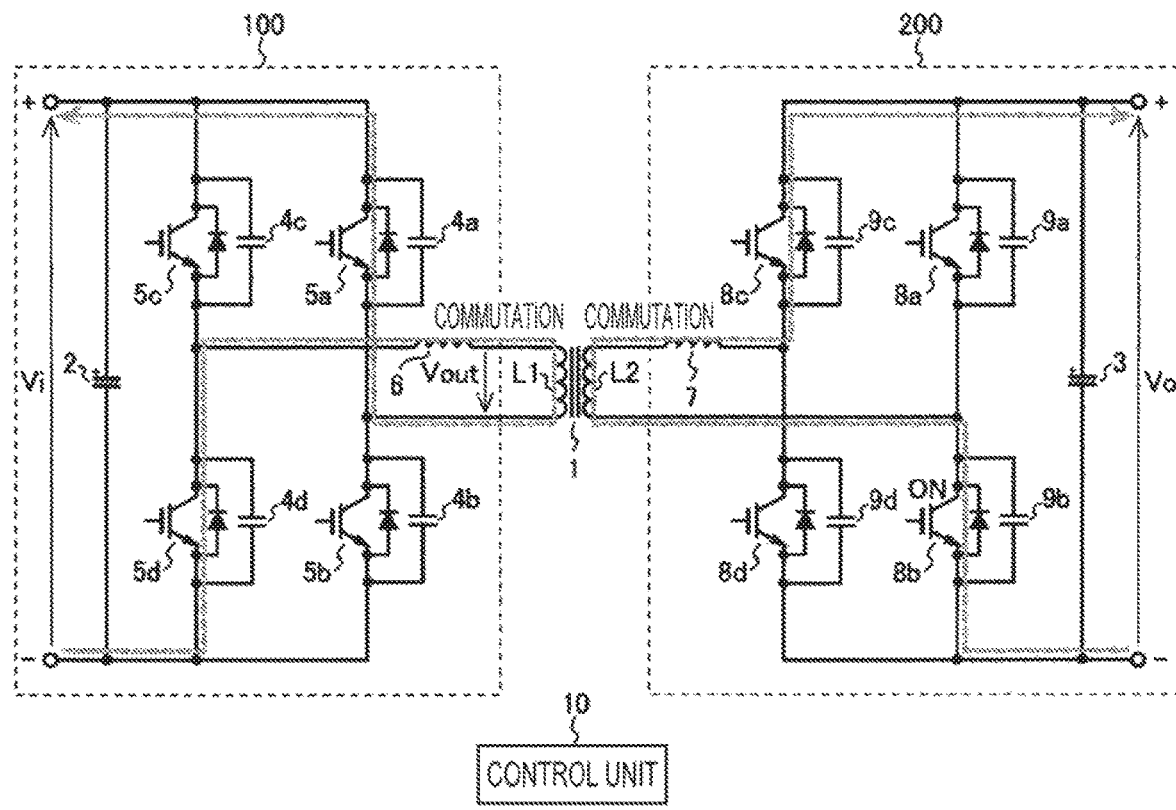
FIG. 12 is a diagram for explaining the operation of the DC/DC converter according to the first embodiment.

In a case where time t is t3<t<t4, because the IGBTs 5a to 5d, 8a, 8c, and 8d become the OFF state as illustrated in FIG. 9 and commutation occurs at the reactor 6, a current flows in the primary side converter 100 in an order of the IGBT 5d→the reactor 6→the primary winding L1 of the transformer 1→the IGBT 5a as illustrated in FIG. 12. In the secondary side converter 200, a current continuously keeps flowing to the output end of the secondary side converter 200 due to commutation at the reactor 7.

In a case where time t is t4<t, due to symmetry of a full bridge circuit, the same operation as a case where time t is t0<t<t4 is performed, in which only the combination of the IGBTs to become the ON state is different. Thus, a description will not be made.

In the first control, in a case where the ON-duty is made higher in order to increase the output power of the secondary side converter 200, when the ON-duty becomes as high as 50% except dead time, the output power of the secondary side converter 200 may not be increased any more. However, switching is performed from the first control to the second control, and the output power of the secondary side converter 200, which is larger than the maximum output power of the secondary side converter 200 in the first control, may thereby be obtained.

Consequently, in a case where the ON-duty of each piece of switching control conducted in the first control reaches approximately 50%, the first control may be switched to the second control.

Figure 13A:
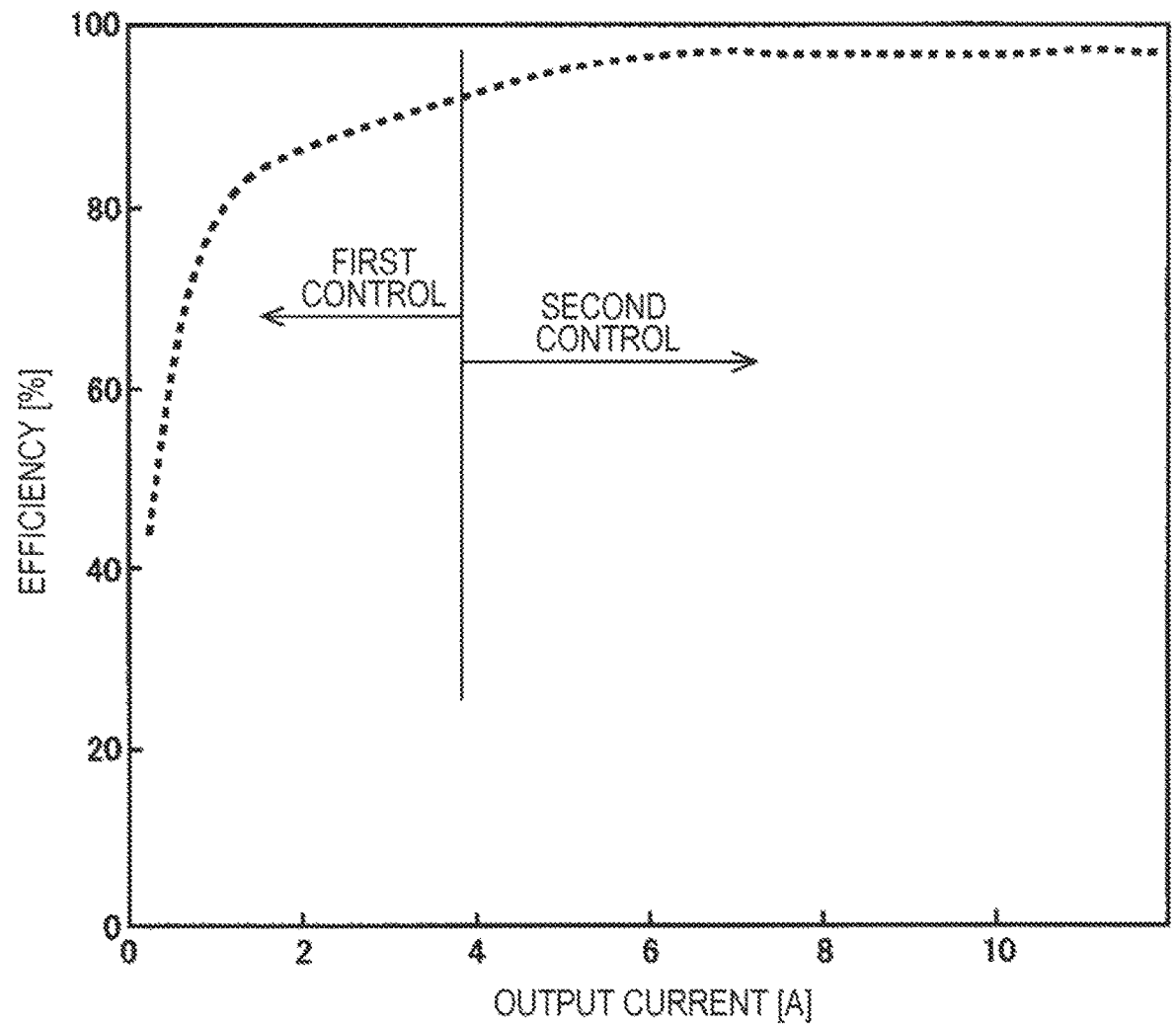
FIG. 13A is a diagram that illustrates an efficiency characteristic of the DC/DC converter according to the first embodiment.

FIG. 13A is a diagram that illustrates an efficiency characteristic in the sequence of this embodiment. Switching is performed from the first control to the second control, and an output current and further the output power of the secondary side converter 200 may seamlessly be made larger.

In this embodiment, a decrease in the prescribed phase difference and an increase in the shift of phase are simultaneously performed when switching is performed from the first control to the second control, and the output power is thereby inhibited from dropping in a case where switching is performed from the first control to the second control. A detailed description will be made about this phenomenon in which the output power drops.

When switching is performed from the first control to the second control, the first control side is in a state where the largest power is supplied, and the ON-duty is highest. Consequently, gate voltage waveforms of the IGBTs 5a and 5b on the first control side in switching from the first control to the second control become like FIG. 13B to FIG. 13E.

Note that in the first control, a secondary side full bridge circuit substantially performs only a rectification operation and thus has no relation to the phenomenon in which the output power drops. Further, because the IGBTs 5*a* and 5*b* and the IGBTs 5*c* and 5*d* perform symmetrical operations, only the IGBTs 5*a* and 5*b* will be mentioned here.

Figure 13B:
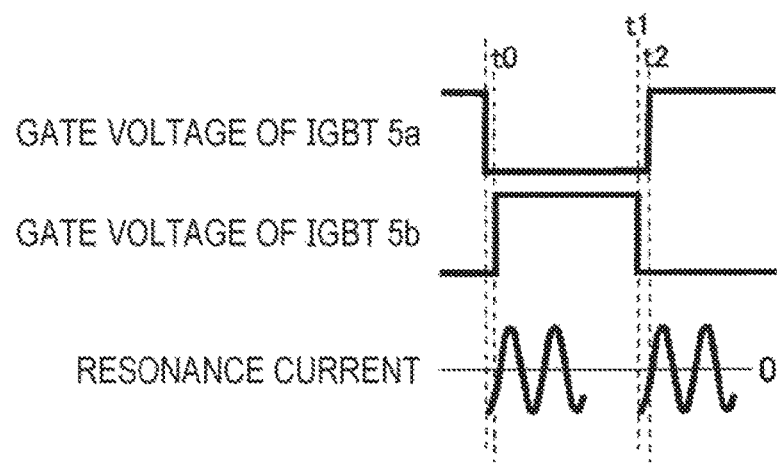
FIG. 13B is a timing diagram that illustrates gate voltage waveforms of the IGBTs.

In a case of the above first reference example, when the ON-duty reaches 50% except dead time, as illustrated in FIG. 13B, the turning ON timing of the IGBT 5*b* with respect to the resonance current generated after turning OFF of the IGBT 5*a* is a timing at which ZVS is achieved. Further, as illustrated in FIG. 13B, the turning ON timing of the IGBT 5*a* with respect to the resonance current generated after turning OFF of the IGBT 5*b* is also a timing at which ZVS is achieved. This is because there is no fundamental difference between the IGBT 5*a* and the IGBT 5*b* due to symmetry of a primary side full bridge circuit.

However, in a case where the prescribed phase difference is provided as in this embodiment, the symmetry of the primary side full bridge circuit is broken.

Because the phase difference between the switching operations for the IGBT 5*a* and the IGBT 5*b* is not 180 degrees, the IGBT 5*a* is turned OFF before the ON-duty reaches 50% except dead time, a timing t0 at which the IGBT 5*b* is turned ON comes before a timing t2 at which the IGBT 5*b* is in the OFF state and the IGBT 5*a* is turned ON, and except dead time, the IGBTs 5*a* and 5*b* reach a positional relationship that is about to cause an arm short circuit.

Figure 13C:
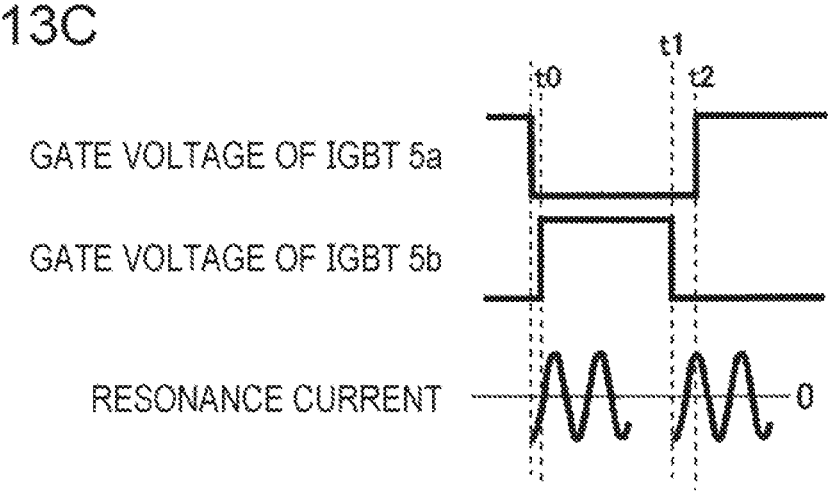
FIG. 13C is a timing diagram that illustrates gate voltage waveforms of the IGBTs.
Figure 13D:
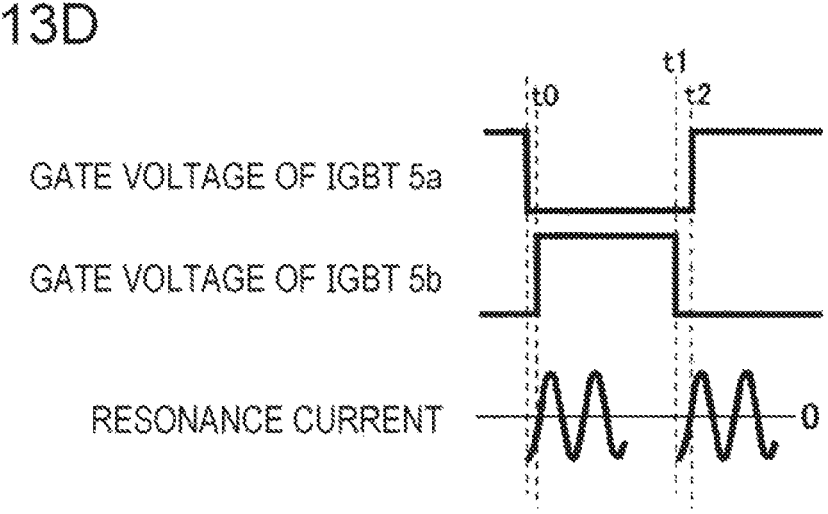
FIG. 13D is a timing diagram that illustrates gate voltage waveforms of the IGBTs.
Figure 13E:
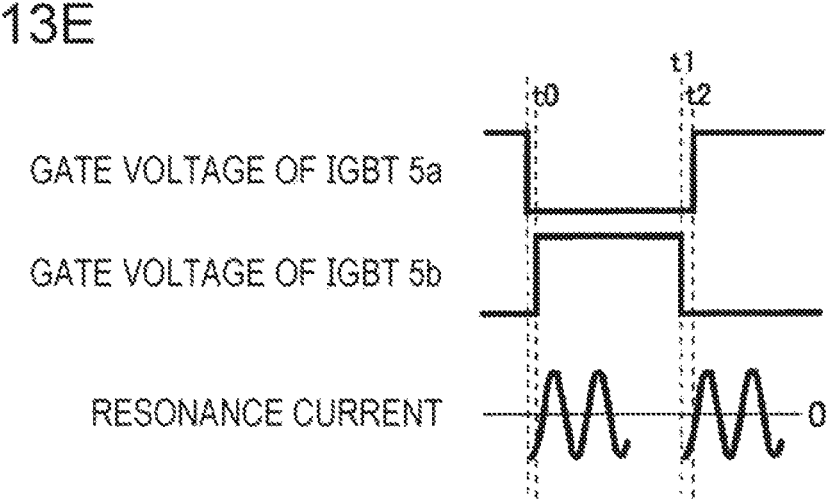
FIG. 13E is a timing diagram that illustrates gate voltage waveforms of the IGBTs.

Subsequently, while the dead time on the timing t0 side is fixed, the IGBTs 5*a* and 5*b* reach FIG. 13E via an operation for narrowing the dead time on the timing t2 side. FIG. 13E is the same state as FIG. 13B and is a state where the output power is smallest in the second control.

A description will be made about achievement and non-achievement of ZVS at each of the timings t0 and t2 in an operation that starts from FIG. 13C and reaches FIG. 13E (an operation for increasing the ON-duty). Because FIG. 13E is the same state as FIG. 13B, ZVS is achieved at both of the timings t0 and t2. In FIG. 13C, ZVS is achieved at the timing t0, but ZVS is not achieved at the timing t2. FIG. 13D is an intermediate state between FIG. 13C and FIG. 13E. Because the dead time on the timing t0 side is fixed, ZVS is kept achieved at the timing t0. ZVS is not achieved at the timing t2, but the IGBTs 5*a* and 5*b* are in a state that is approaching achievement.

Note that in a case where ZVS is achieved, the emitter current becomes like a case where turning ON is performed at the timing p1 indicated in FIG. 8C. In a case where ZVS is not achieved, the emitter current becomes like a case where turning ON is performed at the timing p3 indicated in FIG. 8C. Thus, at the same ON-duty, the output power becomes small in a case where ZVS is achieved compared to a case where ZVS is not achieved.

Consequently, among FIG. 13C to FIG. 13E, the output power is largest in FIG. 13C, and the output power is smallest in FIG. 13E. Because the ON-duty is increased in control in which transition is performed in an order of FIG. 13C, FIG. 13D, and FIG. 13E, augmentation of the output power is expected. However, taking into account the resonance current, on the contrary, the output power becomes small while transition is performed in the order of FIG. 13C, FIG. 13D, and FIG. 13E.

Figure 13F:
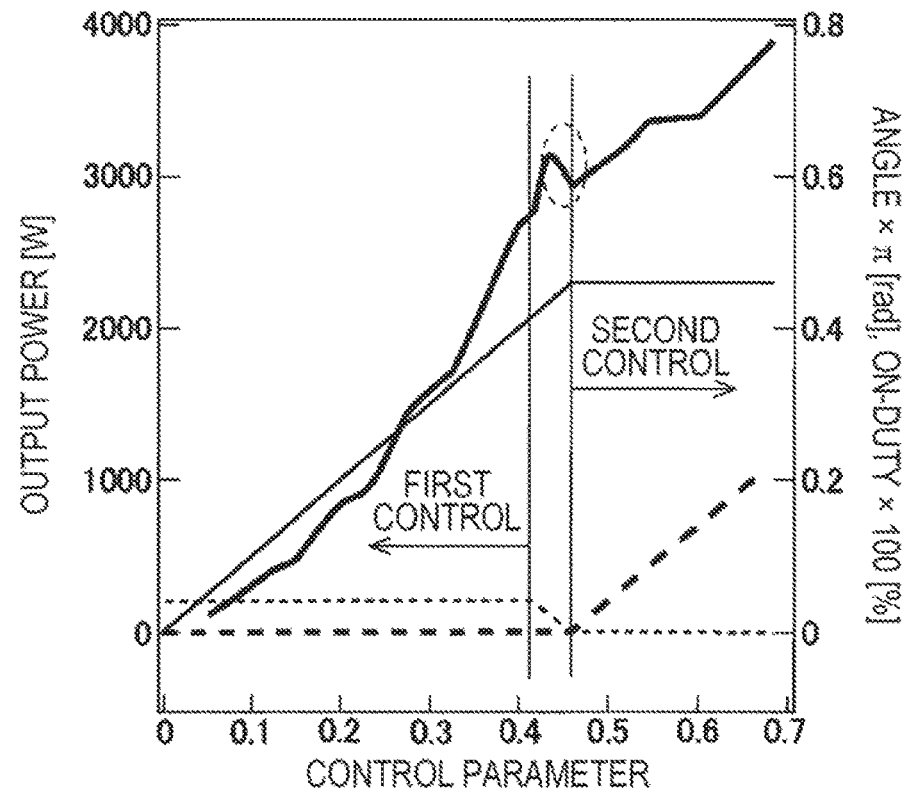
FIG. 13F is a diagram that illustrates an output power waveform of a DC/DC converter according to a second reference example.

Thus, differently from this embodiment, in a second reference example in which the shift of phase is not increased when the prescribed phase difference is decreased in a case where switching is performed from the first control to the second control, as illustrated in FIG. 13F, a drop of the output power appears when switching is performed from the first control to the second control (see the dotted line ellipse in FIG. 13F).

Figure 13G:
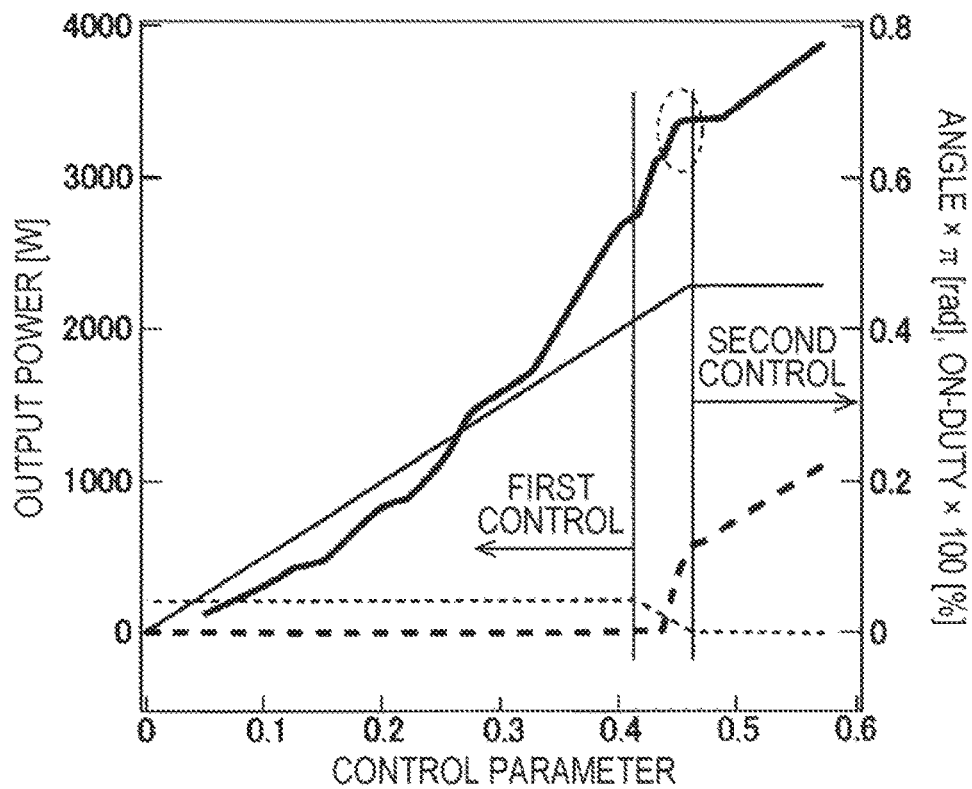
FIG. 13G is a diagram that illustrates an output power waveform of the DC/DC converter according to this embodiment.

On the other hand, in this embodiment, as illustrated in FIG. 13G, no drop of the output power appears when switching is performed from the first control to the second control (see the dotted line ellipse in FIG. 13G). Further, in a case where switching is performed from the first control to the second control in the first reference example, as illustrated in FIG. 13H, the drop of the output power that appears in switching from the first control to the second control becomes larger than in the second reference example.

Figure 13H:
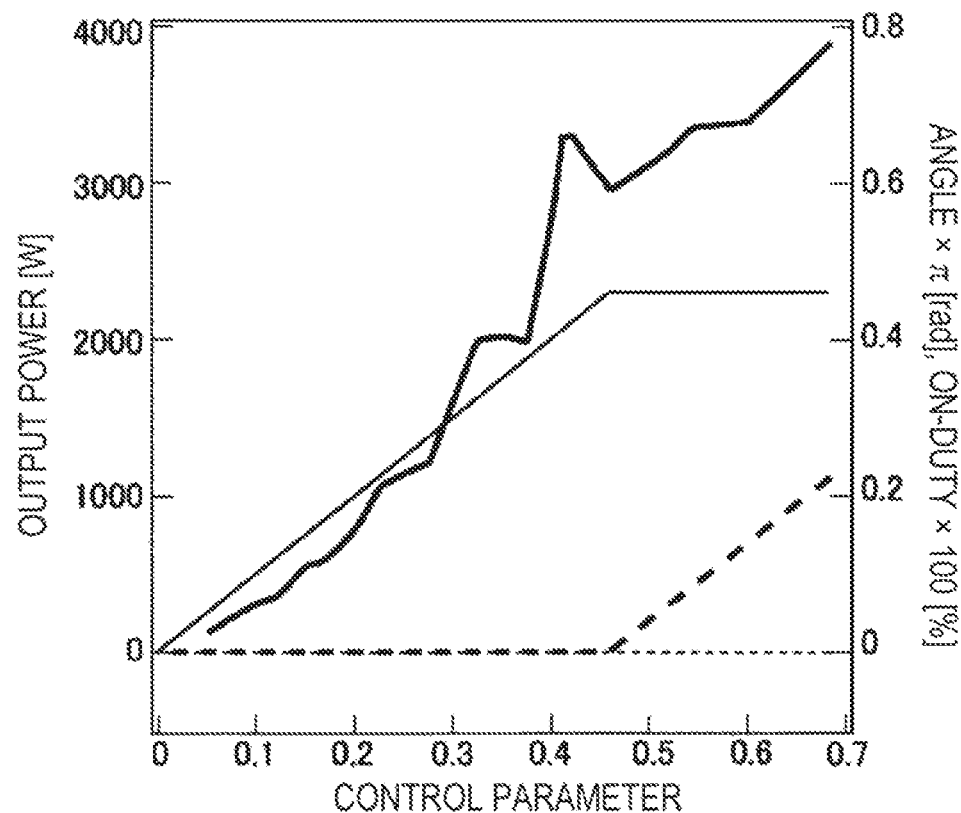
FIG. 13H is a diagram that illustrates an output power waveform of the DC/DC converter according to the first reference example.

Note that in FIG. 13F to FIG. 13H, a control parameter is a parameter that is set by the control unit 10 in accordance with target output power, the bold solid line represents the output power, the thin solid line represents the primary side ON-duty, the bold dotted line represents the shift of phase, and the thin dotted line represents the prescribed phase difference.

Figure 13I:
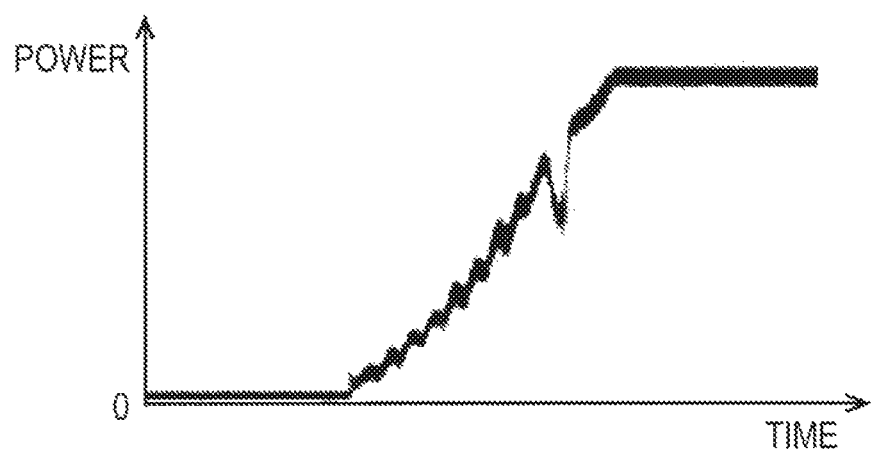
FIG. 13I is a timing diagram that illustrates an output power waveform of the DC/DC converter according to the second reference example.
Figure 13J:
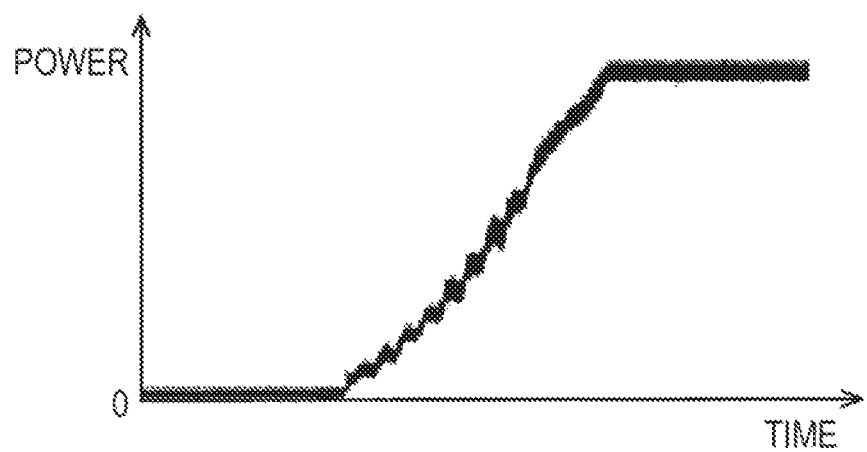
FIG. 13J is a timing diagram that illustrates an output power waveform of the DC/DC converter according to this embodiment.

An effect of inhibiting the drop of the output power in switching from the first control to the second control in this embodiment has also been observed in actual measurement. FIG. 13I illustrates an output power waveform of a DC/DC converter according to the second reference example, and FIG. 13J illustrates an output power waveform of the DC/DC converter according to this embodiment. It may be observed that a decrease in the prescribed phase difference and an increase in the shift of phase are simultaneously performed when switching is performed from the first control to the second control as in this embodiment and the output power may thereby be inhibited from dropping in a case where switching is performed from the first control to the second control.

Second Embodiment

An outline configuration of a DC/DC converter according to this embodiment is the same as the outline configuration of the DC/DC converter according to the first embodiment.

The control unit 10 in this embodiment may perform direct switching from the first control to the second control, perform direct switching from the second control to third control, perform direct switching from the third control to the second control, and perform direct switching from the second control to the first control.

Figure 14:
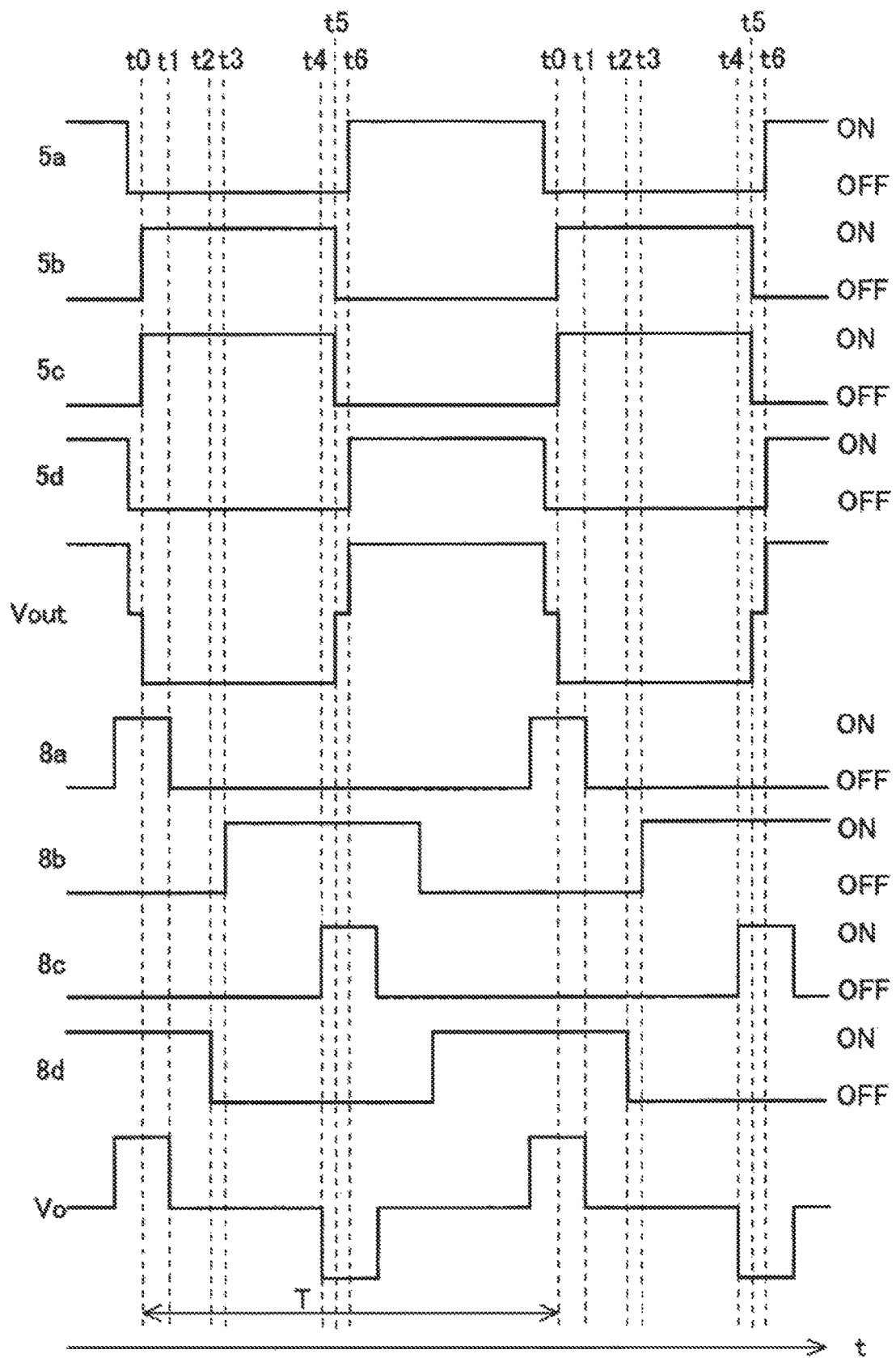
FIG. 14 is a timing diagram that illustrates states of the IGBTs and output voltage waveforms of the primary and secondary side converters.

FIG. 14 is a timing diagram that illustrates states of the IGBTs, a waveform of the output voltage Vout of the primary side converter 100, and a waveform of the output voltage Vo of the secondary side converter 200 in a case where the control unit 10 performs the third control. The IGBTs 5*b* and 5*c* and the IGBTs 5*a* and 5*d* are complementarily tuned ON and OFF except dead time. The ON-duty of the IGBTs 5*a* to 5*d* is considered to be 50% if dead time is excepted. The IGBT 8*b* is switched in a state where the phase is shifted by 90 degrees with respect to the IGBTs 5*b* and 5*c*, and the IGBT 8*d* is switched in a state where the phase is shifted by 90 degrees with respect to the IGBTs 5*a* and 5*d*. The ON-duty of the IGBTs 8*b* to 8*d* is also considered to be 50% if dead time is excepted. The IGBT 8*a* is switched in a state where the phase is shifted with respect to the IGBTs 5*b* and 5*c*, and the IGBT 8*c* is switched in a state where the phase is shifted with respect to the IGBTs 5*a* and 5*d*. In the third control, the ON-duty of the IGBTs 8*a* and 8*c* is changed, and third output power output from the secondary side converter 200 is thereby adjusted.

Figure 15:
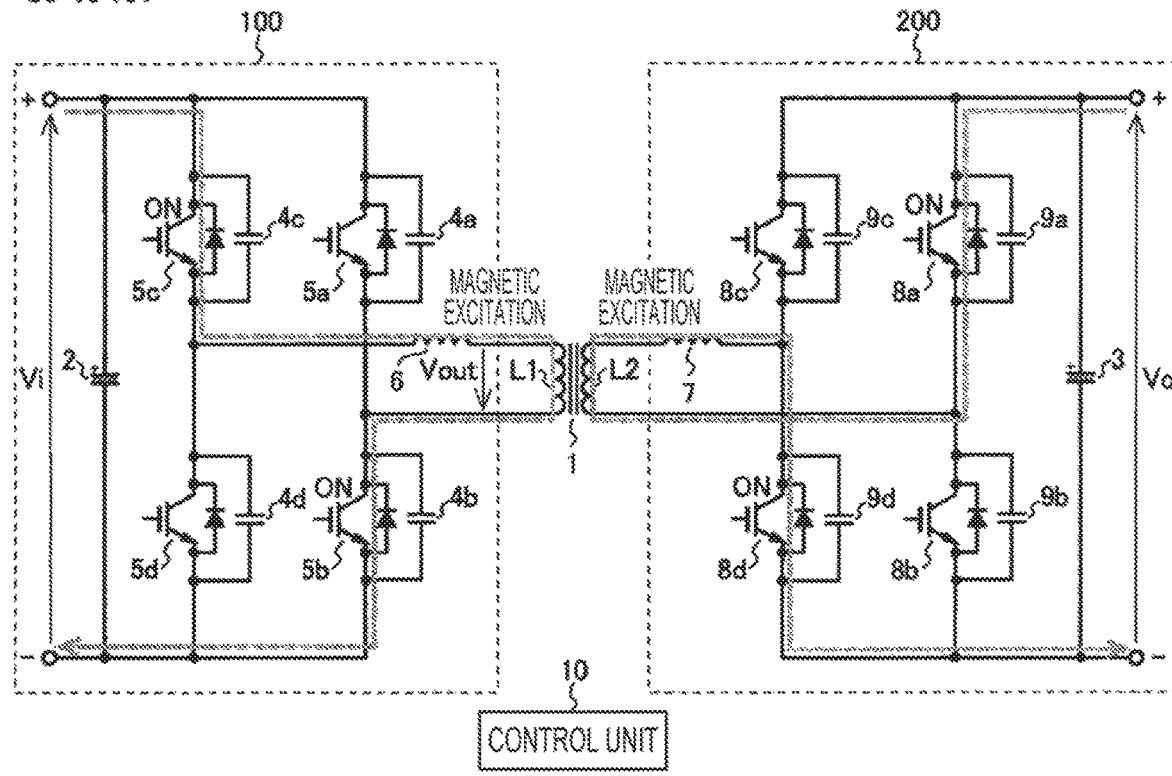
FIG. 15 is a diagram for explaining an operation of a DC/DC converter according to a second embodiment.

In a case where time t is t0<t<t1, because the IGBTs 5*b*, 5*c*, 8*a*, and 8*d* are in the ON state as illustrated in FIG. 14, a current flows in the primary side converter 100 in an order of the IGBT 5*c*→the reactor 6→the primary winding L1 of the transformer 1→the IGBT 5*b* as illustrated in FIG. 15, and a current flows in the secondary side converter 200 in an order of the IGBT 8a→the secondary winding L2 of the transformer 1→the reactor 7→the IGBT 8d as illustrated in FIG. 15. Accordingly, the reactors 6 and 7 are magnetically excited by both of the input voltage Vi and the output voltage Vo, and energy is accumulated in the reactors 6 and 7.

Figure 16:
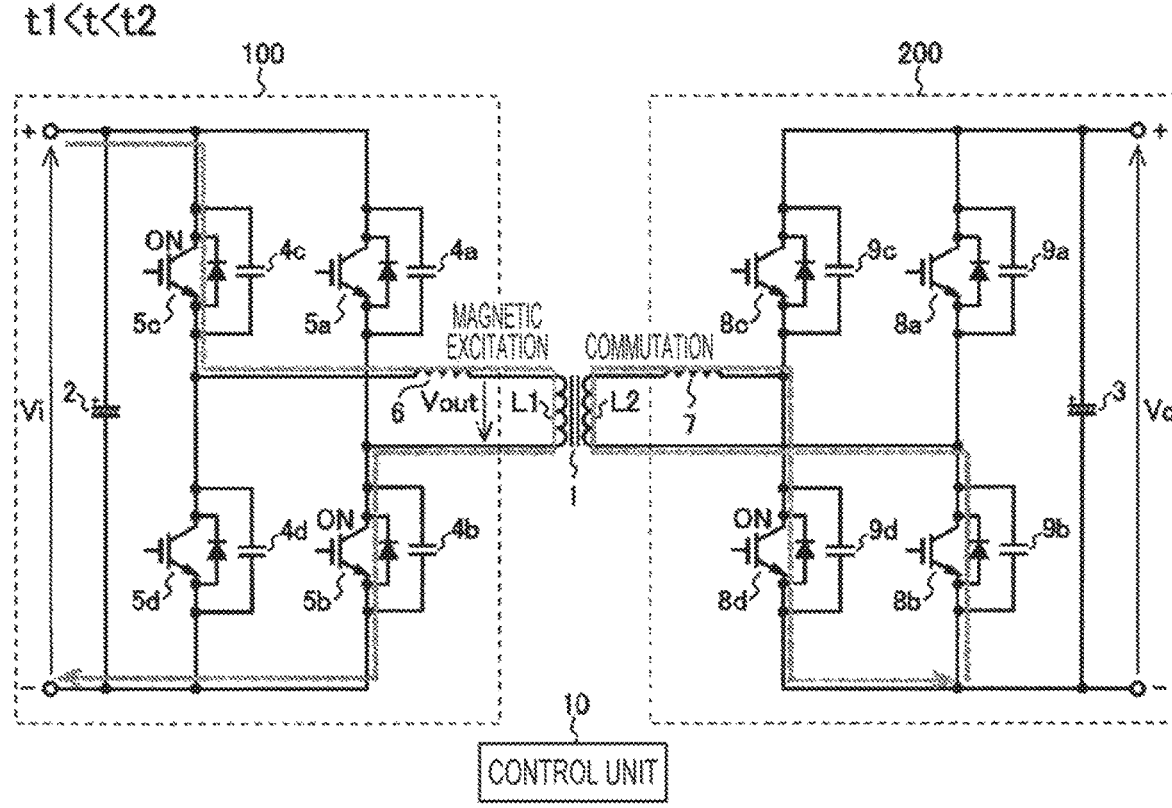
FIG. 16 is a diagram for explaining the operation of the DC/DC converter according to the second embodiment.

The IGBT 8a is turned OFF at a timing when time t becomes t=t1. In a case where time t is t1<t<t2, the IGBT 8a becomes the OFF state. Thus, due to electromotive force generated in the secondary winding L2 of the transformer 1, as illustrated in FIG. 16, a current flows in the secondary side converter 200 in an order of the IGBT 8b→the secondary winding L2 of the transformer 1→the reactor 7→the IGBT 8d. As illustrated in FIG. 16, in the primary side converter 100, the reactor 6 is magnetically excited by the input voltage Vi, and energy is accumulated in the reactor 6.

Figure 17:
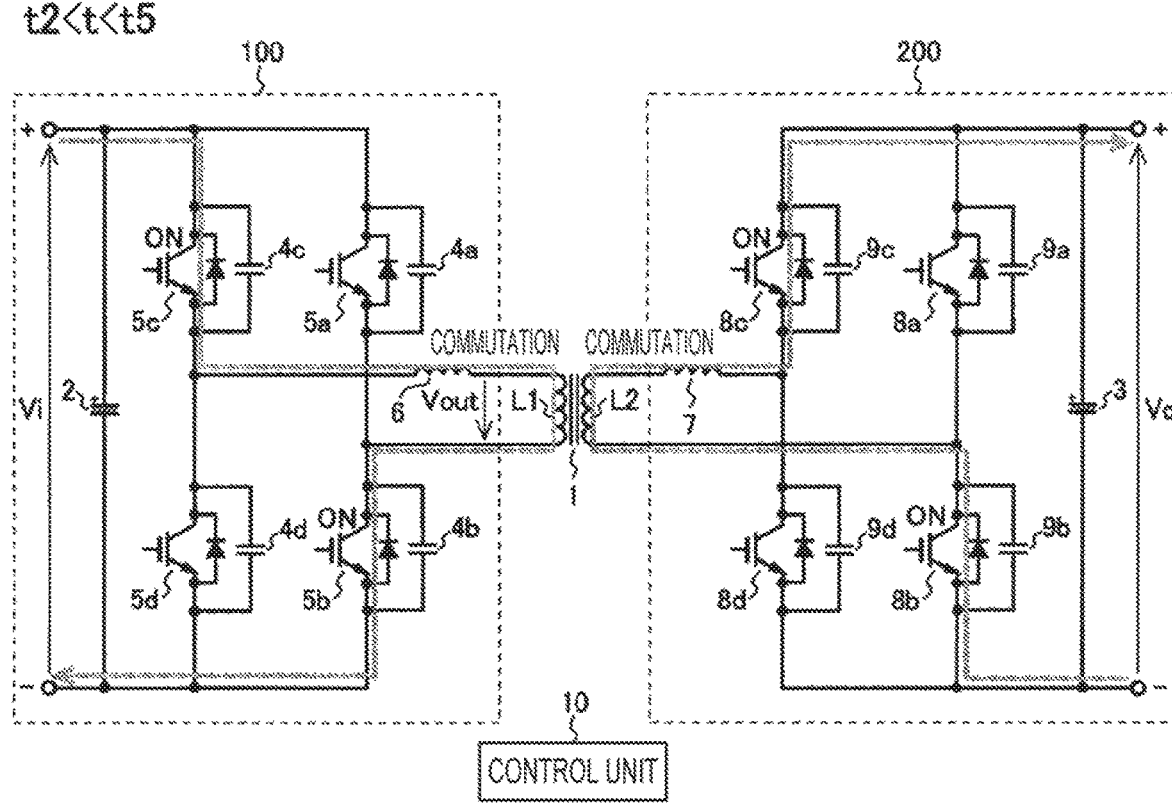
FIG. 17 is a diagram for explaining the operation of the DC/DC converter according to the second embodiment.

In a case where time t is t2<t<t3, all the IGBTs 5a, 5d, and 8a to 8d become the OFF state as illustrated in FIG. 14. Further, in a case where time t is t3<t<t4, the IGBTs 5a to 5d, 8a, 8c, and 8d becomes the OFF state as illustrated in FIG. 14. In addition, in a case where time t is t4<t<t5, the IGBTs 5a, 5d. 8a, and 8d becomes the OFF state as illustrated in FIG. 14. In all of those periods, that is, in a case where time t is t2<t<t5, a current flows in the secondary side converter 200 in an order of the IGBT 8b→the secondary winding L2 of the transformer 1 the reactor 7→the IGBT 8c as illustrated in FIG. 17. In this case, in the secondary winding L2 of the transformer 1, electromotive force induced by the current that flows through the primary side converter 100 is present, and electromotive force in commutation at the reactor 7 is piled up in addition. Accordingly, the output voltage Vo of the secondary side converter 200 is boosted. Note that because turtling ON of the IGBT 8b at a timing when time t becomes t=t3 and turning ON of the IGBT 8c at a timing when time t becomes t=t4 are performed in a commutation period, ZVS is achieved.

Figure 18:
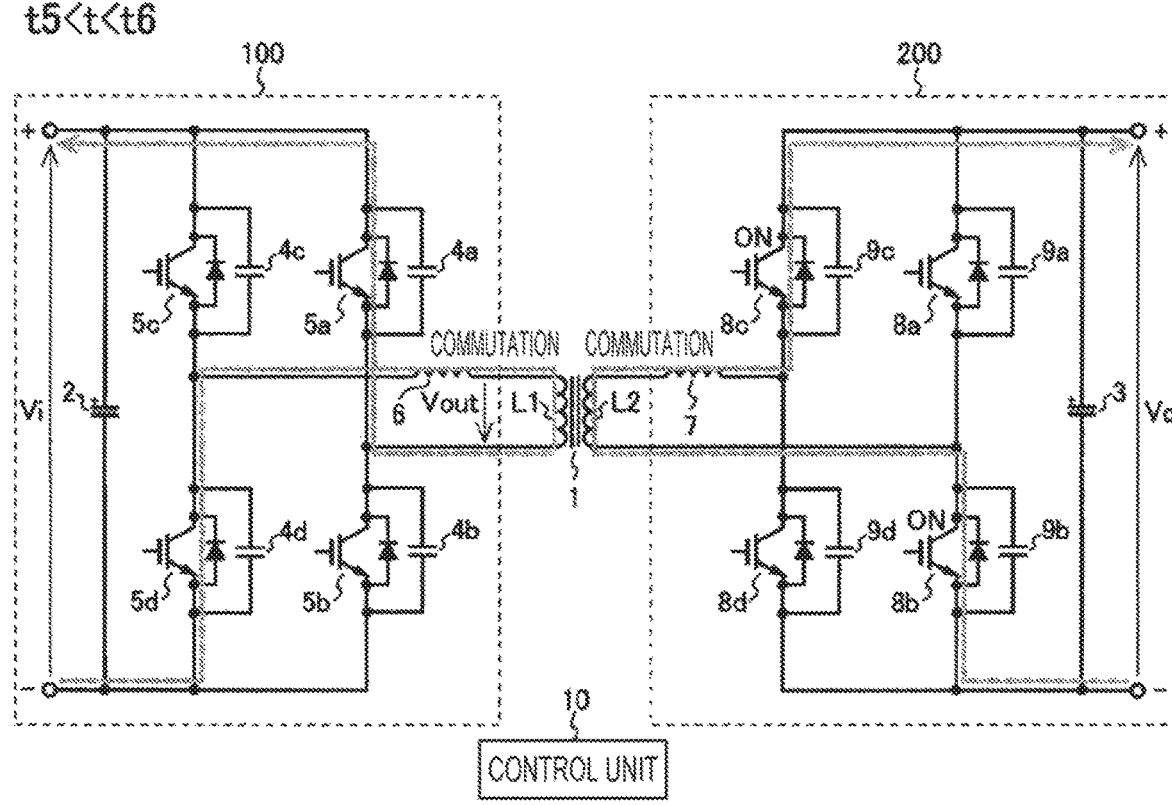
FIG. 18 is a diagram for explaining the operation of the DC/DC converter according to the second embodiment.

In a case where time t is t5<t<t6, because the IGBTs 5a to 5d become the OFF state as illustrated in FIG. 14 and commutation occurs at the reactor 6, a current flows in the primary side converter 100 in an order of the IGBT 5d→the reactor 6→the primary winding L1 of the transformer 1→the IGBT 5a as illustrated in FIG. 18. In the secondary side converter 200, a current continuously keeps flowing to the output end of the secondary side converter 200 due to commutation at the reactor 7.

Because a current flows in the direction from the emitters to the collectors in the IGBTs 5a and 5d when the IGBTs 5a and 5d are turned ON at a timing when time t becomes t=t6, ZVS is achieved.

In a case where time t is t6<t, due to symmetry of a full bridge circuit, the same operation as a case where time t is t0<t<t6 is performed, in which only the combination of the IGBTs to become the ON state is different. Thus, a description will not be made.

In the second control, in a case where the shift amount of phase of the IGBTs 8b and 8d with respect to the IGBTs 5a to 5d is made larger in order to increase the output power of the secondary side converter 200, when the shift amount of phase is made large to 90 degrees, the output power of the secondary side converter 200 may not be increased any more. This is because in a case where the phase is shifted by larger than 90 degrees, the magnetic excitation period of the reactor becomes long, and large energy may be stored in the reactor, but because the commutation period for sending out the stored energy to an output side becomes short, the output power is not increased but decreased, contrarily.

However, direct switching is performed from the second control to the third control, and the output power of the secondary side converter 200, which is larger than the maximum output power of the secondary side converter 200 in the second control, may thereby seamlessly be obtained.

Consequently, in a case where the shift amount of phase of the IGBTs 8b and 8d with respect to the IGBTs 5a to 5d reaches 90 degrees in the second control, direct switching may be performed from the second control to the third control.

Note that because an output power band of the secondary side converter 200 in the second control may also be output in the third control, direct switching may be performed from the second control to the third control before the shift amount of phase of the IGBTs 8b and 8d with respect to the IGBTs 5a to 5d reaches 90 degrees in the second control. However, compared to the third control, the second control may suppress a peak value of the current flowing through the circuit to a low value. Consequently, compared to the third control, the second control may reduce copper loss in components through which a current passes and reduce hysteresis loss in magnetic components and is thus advantageous in view of efficiency. Further, a peak current is suppressed low, and a ripple current is thereby reduced in the second control compared to the third control.

Note that also in this embodiment, similarly to the first embodiment, the first control is directly switched to control in which control for the primary side converter 100 and control for the secondary side converter 200 in the first control are interchanged with each other, and power transmission from the primary side converter 100 to the secondary side converter 200 may thereby be switched to power transmission from the secondary side converter 200 to the primary side converter 100. In addition, the control unit 10 may be enabled to perform control in which control for the primary side converter 100 and control for the secondary side converter 200 in each of the second control and the third control are interchanged with each other.

CONCLUSION

In the foregoing, the embodiments of the present invention have been described. However, the scope of the present invention is not limited thereto but may be applied with various alterations without departing from the gist the invention. Note that the above-described first reference example and second reference example are included in the scope of the present invention.

For example, the IGBTs 8a and 8c are fixed to the OFF state in the first control and the second control. However, the IGBTs 8b and 8d may be fixed to the OFF state instead of the IGBTs 8a and 8c.

For example, another transistor such as a metal-oxide-semiconductor field-effect transistor (MOSFET) may be used instead of an IGBT. Note that in a case where the transmission direction of power is not made bi-directional, in the first embodiment and the second embodiment, a diode may be used instead of the IGBT that is fixed to the OFF state.

For example, the prescribed phase difference may not be fixed but may dynamically be controlled by the control unit 10. In a case where the prescribed phase difference is dynamically controlled by the control unit 10, for example, the prescribed phase difference may dynamically be set in accordance with at least one of (I) the ON-duty of the IGBTs 5a to 5d, 8b, and 8d, (II) the input voltage Vi and the output voltage Vo of the secondary side converter 200, and (III) the output current of the secondary side converter 200.

For example, in the third control, the IGBT 8*a* is switched in a state where the phase is shifted by half a cycle with respect to the IGBT 8*c* (in a state where the phase is shifted by 180 degrees), and the IGBT 8*b* is switched in a state where the phase is shifted by half a cycle with respect to the IGBT 8*d* (in a state where the phase is shifted by 180 degrees). However, as long as the IGBTs 8*a* and 8*d* are not turned ON at the same time and the IGBTs 8*b* and 8*c* are not turned ON at the same time, any shift amount of phase may be used. Further, the shift amount of phase may not be fixed but may dynamically be controlled by the control unit 10.

In the above-described embodiments, the transformer has two windings. However, a multi-directional DC/DC converter is possible in which a transformer has three or more windings, a converter in a full bridge configuration is connected with each of the windings, all the windings may become input sides at a certain moment and may become output sides at another moment, and power transmission is possible between two arbitrary windings.

One example of the above-described DC/DC converter has a configuration in which the DC/DC converter includes: a primary side converter (100) that has a primary side reactor (6), plural primary side semiconductor switching elements (5*a* to 5*d*), and plural primary side capacitors (4*a* to 4*d*) which are respectively connected in parallel with the plural primary side semiconductor switching elements; a transformer (1) that has a primary winding (L1) and a secondary winding (L2); a secondary side converter (200) that has a secondary side reactor (7), plural secondary side semiconductor switching elements (8*a* to 8*d*), and plural secondary side capacitors (9*a* to 9*d*) which are respectively connected in parallel with the plural secondary side semiconductor switching elements; and a control unit (10) that controls the plural primary side semiconductor switching elements and controls the plural secondary side semiconductor switching elements which are not diodes, in which the primary side reactor is connected with the primary winding and/or is leakage inductance of the primary winding, the secondary side reactor is connected with the secondary winding and/or is leakage inductance of the secondary winding, the primary side converter and the secondary side converter each have a full bridge circuit, in a case where the control unit performs first control in which first output power is caused to be output from the secondary side converter, the control unit performs switching control of the primary side semiconductor switching element positioned on an upper side of a first arm of the primary side converter and the primary side semiconductor switching element positioned on a lower side of a second arm of the primary side converter such that turning ON periods are matched, performs switching control of the primary side semiconductor switching element positioned on a lower side of the first arm of the primary side converter and the primary side semiconductor switching element positioned on an upper side of the second arm of the primary side converter such that turning ON periods are matched, does not perform switching control of two switching elements positioned on one side between an upper side of first and second arms and a lower side of the first and second arms of the secondary side converter, performs switching control of one of the two secondary side semiconductor switching elements positioned on the other side between the upper side of the first and second arms and the lower side of the first and second arms of the secondary side converter in a case where the one of the two secondary side semiconductor switching elements is not a diode, such that a turning ON period matches the turning ON periods of the primary side semiconductor switching element positioned on the upper side of the first arm of the primary side converter and the primary side semiconductor switching element positioned on the lower side of the second arm of the primary side converter, performs switching control of the other of the two secondary side semiconductor switching elements positioned on the other side between the upper side of the first and second arms and the lower side of the first and second arms of the secondary side converter in a case where the other of the two secondary side semiconductor switching elements is not a diode, such that a turning ON period matches the turning ON periods of the primary side semiconductor switching element positioned on the lower side of the first arm of the primary side converter and the primary side semiconductor switching element positioned on the upper side of the second arm of the primary side converter, and adjusts first output power output from the secondary side converter by changing ON-duty of each piece of switching control to be conducted (first configuration).

In such a configuration, when the primary side semiconductor switching element is turned ON, the charge accumulated in the capacitor connected in parallel with the primary side semiconductor switching element may be made less. Consequently, switching loss in a case where zero voltage switching is not achieved may be reduced.

In the DC/DC converter in the above first configuration, a configuration may be provided in which the primary side semiconductor switching element positioned on the upper side of the first arm of the primary side converter is switched, at a prescribed phase difference, from the primary side semiconductor switching element positioned on the lower side of the first arm of the primary side converter, the prescribed phase difference is a shift of an angle, which corresponds to approximately ¼ of a reciprocal of a resonance frequency, from 180 degrees, and the resonance frequency is defined by the primary side reactor and the primary side capacitors (second configuration).

In such a configuration, a periodic fluctuation of the output voltage, which appears in response to increases and decreases in the ON-duty in a light load case, may be reduced.

Another example of the above-described DC/DC converter has a configuration in which the DC/DC converter includes: a primary side converter (100) that has a primary side reactor (6), plural primary side semiconductor switching elements (5*a* to 5*d*), and plural primary side capacitors (4*a* to 4*d*) which are respectively connected in parallel with the plural primary side semiconductor switching elements; a transformer (1) that has a primary winding (L1) and a secondary winding (L2): a secondary side converter (200) that has a secondary side reactor (7), plural secondary side semiconductor switching elements (8*a* to 8*d*), and plural secondary side capacitors (9*a* to 9*d*) which are respectively connected in parallel with the plural secondary side semiconductor switching elements; and a control unit (10) that controls the plural primary side semiconductor switching elements and the plural secondary side semiconductor switching elements, in which the primary side reactor is connected with the primary winding and/or is leakage inductance of the primary winding, the secondary side reactor is connected with the secondary winding and/or is leakage inductance of the secondary winding, the primary side converter and the secondary side converter each have a full bridge circuit, in a case where the control unit performs first control in which first output power is caused to be output from the secondary side converter, the control unit performs switching control of the primary side semiconductor switching element positioned on an upper side of a first arm of the primary side converter and the primary side semiconductor switching element positioned on a lower side of a second arm of the primary side converter such that turning ON periods are matched, performs switching control of the primary side semiconductor switching element positioned on a lower side of the first arm of the primary side converter and the primary side semiconductor switching element positioned on an upper side of the second arm of the primary side converter such that turning ON periods are matched, does not perform switching control of two switching elements positioned on one side between an upper side of first and second arms and a lower side of the first and second arms of the secondary side converter, performs switching control of one of the two secondary side semiconductor switching elements positioned on the other side between the upper side of the first and second arms and the lower side of the first and second arms of the secondary side converter such that a turning ON period matches the turning ON periods of the primary side semiconductor switching element positioned on the upper side of the first arm of the primary side converter and the primary side semiconductor switching element positioned on the lower side of the second arm of the primary side converter, and performs switching control of the other of the two secondary side semiconductor switching elements positioned on the other side between the upper side of the first and second arms and the lower side of the first and second arms of the secondary side converter such that a turning ON period matches the turning ON periods of the primary side semiconductor switching element positioned on the lower side of the first arm of the primary side converter and the primary side semiconductor switching element positioned on the upper side of the second arm of the primary side converter, the primary side semiconductor switching element positioned on the upper side of the first arm of the primary side converter is switched, at a prescribed phase difference, from the primary side semiconductor switching element positioned on the lower side of the first arm of the primary side converter, the prescribed phase difference is a shift of an angle, which corresponds to approximately ¼ of a reciprocal of a resonance frequency, from 180 degrees, the resonance frequency is defined by the primary side reactor and the primary side capacitors, first output power output from the secondary side converter is adjusted by changing ON-duty of each piece of switching control to be conducted, in a case where the control unit performs second control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, does not perform switching control of two switching elements positioned on one side between the upper side of the first and second arms and the lower side of the first and second arms of the secondary side converter, performs switching control of the two secondary side semiconductor switching elements positioned on the other side between the upper side of the first and second arms and the lower side of the first and second arms of the secondary side converter such that phases of turning ON periods are shifted from phases of the turning ON periods of the four primary side semiconductor switching elements of the primary side converter, and adjusts second output power output from the secondary side converter by the shifts of phase while the ON-duty of each piece of switching control to be conducted is approximately 50%, and the control unit simultaneously performs a decrease in the prescribed phase difference and an increase in the shift of phase in a case where the control unit performs switching from the first control to the second control (third configuration).

In such a configuration, when the primary side semiconductor switching element is turned ON, the charge accumulated in the capacitor connected in parallel with the primary side semiconductor switching element may be made less. Consequently, switching loss in a case where zero voltage switching is not achieved may be reduced. Further, in such a configuration, a periodic fluctuation of the output voltage, which appears in response to increases and decreases in the ON-duty in a light load case, may be reduced. In addition, in such a configuration, the output power of the secondary side converter, which is larger than the maximum output power of the secondary side converter in the first control, may be obtained. Further, the output power may be inhibited from dropping in a case where switching is performed from the first control to the second control.

In the DC/DC converter in any of the above first to third configurations, a configuration may be provided in which the two switching elements positioned on one side between the upper side of the first and second arms and the lower side of the first and second arms of the secondary side converter are the secondary side semiconductor switching elements and the control unit performs direct switching from the first control to control, in which control for the primary side converter and control for the secondary side converter in the first control are interchanged with each other, to perform switching from power transmission from the primary side converter to the secondary side converter to power transmission from the secondary side converter to the primary side converter (fourth configuration).

In such a configuration, while the switching loss related to non-achievement of ZVS is maintained small, directions of power transmission may seamlessly be switched.

In the DC/DC converter in the above first or second configuration, a configuration may be provided in which in a case where the control unit performs second control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, does not perform switching control of two switching elements positioned on one side between the upper side of the first and second arms and the lower side of the first and second arms of the secondary side converter, performs switching control of the two secondary side semiconductor switching elements positioned on the other side between the upper side of the first and second arms and the lower side of the first and second arms of the secondary side converter such that phases of turning ON periods are shifted from phases of the turning ON periods of the four primary side semiconductor switching elements of the primary side converter, and adjusts second output power output from the secondary side converter by the shifts of phase while the ON-duty of each piece of switching control to be conducted is approximately 50% (fifth configuration).

In such a configuration, the output power of the secondary side converter, which is larger than the maximum output power of the secondary side converter in the first control, may be obtained.

In the DC/DC converter in the above fifth configuration, a configuration may be provided in which the first control is directly switched to the second control to switch power being output from the secondary side converter from the first output power to the second output power (sixth configuration).

In such a configuration, the output power of the secondary side converter, which is larger than the maximum output power of the secondary side converter in the first control, may seamlessly be obtained.

In the DC/DC converter in the above third or sixth configuration, a configuration may be provided in which the first control is directly switched to the second control in a case where the ON-duty of each piece of switching control conducted in the first control reaches approximately 50% (seventh configuration).

In such a configuration, the output power of the secondary side converter, which is larger than the maximum output power of the secondary side converter in the first control, may seamlessly be obtained by simple switching of control.

In the DC/DC converter in any of the above fifth to seventh configurations, a configuration may be provided in which in a case where the control unit performs third control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, and performs switching control of the four secondary side semiconductor switching elements of the secondary side converter such that phases of turning ON periods are shifted from phases of the turning ON periods of the four primary side semiconductor switching elements of the primary side converter, the ON-duty of each piece of switching control to be conducted is approximately 50% except switching control of two switching elements positioned on one side between the upper side of the first and second arms and the lower side of the first and second arms of the secondary side converter, and third output power output from the secondary side converter is adjusted by changing the ON-duty of the two switching elements positioned on one side between the upper side of the first and second arms and the lower side of the first and second arms of the secondary side converter (eighth configuration).

In such a configuration, the output power of the secondary side converter, which is larger than the maximum output power of the secondary side converter in the second control, may be obtained.

In the DC/DC converter in the above eighth configuration, a configuration may be provided in which the second control is directly switched to the third control to switch the power being output from the secondary side converter from the second output power to the third output power (ninth configuration).

In such a configuration, the output power of the secondary side converter, which is larger than the maximum output power of the secondary side converter in the second control, may seamlessly be obtained.

In the DC/DC converter in the above ninth configuration, a configuration may be provided in which the second control is directly switched to the third control in a case where the shift of phase reaches approximately 90 degrees in the second control (tenth configuration).

In such a configuration, the output power of the secondary side converter, which is larger than the maximum output power of the secondary side converter in the second control, may seamlessly be obtained by simple switching of control.

REFERENCE SIGNS LIST 1 transformer
2, 3, 4a to 4d, 9a to 9d capacitor
5a to 5d, 8a to 8d IGBT
6, 7 reactor
10 control unit
100 primary side converter
200 secondary side converter

The invention claimed is:

1. A DC/DC converter comprising: a primary side converter that has a primary side reactor, plural primary side semiconductor switching elements, and plural primary side capacitors which are respectively connected in parallel with the plural primary side semiconductor switching elements, a transformer that has a primary winding and a secondary winding; a secondary side converter that has a secondary side reactor, plural secondary side semiconductor switching elements, and plural secondary side capacitors which are respectively connected in parallel with the plural secondary side semiconductor switching elements; and a control unit that controls the plural primary side semiconductor switching elements and controls the plural secondary side semiconductor switching elements which are not diodes, wherein the primary side reactor is connected with the primary winding and/or is leakage inductance of the primary winding, the secondary side reactor is connected with the secondary winding and/or is leakage inductance of the secondary winding, the primary side converter and the secondary side converter each have a full bridge circuit, and in a case where the control unit performs first control in which first output power is caused to be output from the secondary side converter, the control unit performs switching control of the primary side semiconductor switching element positioned on an upper side of a first arm of the primary side converter and the primary side semiconductor switching element positioned on a lower side of a second arm of the primary side converter such that turning ON periods are matched, performs switching control of the primary side semiconductor switching element positioned on a lower side of the first arm of the primary side converter and the primary side semiconductor switching element positioned on an upper side of the second arm of the primary side converter such that turning ON periods are matched, does not perform switching control of two switching elements positioned on one side between an upper side of first and second arms and a lower side of the first and second arms of the secondary side converter, performs switching control of one of the two secondary side semiconductor switching elements positioned on other side between the upper side of the first and second arms and the lower side of the first and second arms of the secondary side converter in a case where the one of the two secondary side semiconductor switching elements is not a diode, such that a turning ON period matches the turning ON periods of the primary side semiconductor switching element positioned on the upper side of the first arm of the primary side converter and the primary side semiconductor switching element positioned on the lower side of the second arm of the primary side converter, performs switching control of the other of the two secondary side semiconductor switching elements positioned on the other side between the upper side of the first and second arms and the lower side of the first and second arms of the secondary side converter in a case where the other of the two secondary side semiconductor switching elements is not a diode, such that a turning ON period matches the turning ON periods of the primary side semiconductor switching element positioned on the lower side of the first arm of the primary side converter and the primary side semiconductor switching element positioned on the upper side of the second arm of the primary side converter, and adjusts first output power output from the secondary side converter by changing ON-duty of each piece of switching control to be conducted, wherein the primary side semiconductor switching element positioned on the upper side of the first arm of the primary side converter is switched, at a prescribed phase difference, from the primary side semiconductor switching element positioned on the lower side of the first arm of the primary side converter, the prescribed phase difference is a shift of an angle, which corresponds to approximately ¼ of a reciprocal of a resonance frequency, from 180 degrees, and the resonance frequency is defined by the primary side reactor and the primary side capacitors.

2. The DC/DC converter according to claim 1, wherein
the two switching elements positioned on one side between the upper side of the first and second arms and the lower side of the first and second arms of the secondary side convener are the secondary side semiconductor switching elements, and
the first control is directly switched to control, in which control for the primary side converter and control for the secondary side converter in the first control are interchanged with each other, to perform switching from power transmission from the primary side convener to the secondary side converter to power transmission from the secondary side converter to the primary side converter.

3. The DC/DC converter according to claim 1, wherein in a case where the control unit performs second control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, does not perform switching control of the two switching elements positioned on one side between the upper side of the first and second arms and the lower side of the first and second arms of the secondary side converter, performs switching control of the two secondary side semiconductor switching elements positioned on the other side between the upper side of the first and second arms and the lower side of the first and second arms of the secondary side converter such that phases of turning ON periods are shifted from phases of the turning ON periods of four primary side semiconductor switching elements of the primary side converter, and adjusts second output power output from the secondary side converter by the shifts of phase while the ON-duty of each piece of switching control to be conducted is approximately 50%.

4. The DC/DC converter according to claim 3, wherein
the first control is directly switched to the second control to switch power being output from the secondary side converter from the first output power to the second output power.

5. The DC/DC converter according to claim 3, wherein in a case where the control unit performs third control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, and performs switching control of the four secondary side semiconductor switching elements of the secondary side converter such that phases of turning ON periods are shifted from phases of the turning ON periods of the four primary side semiconductor switching elements of the primary side converter, the ON-duty of each piece of switching control to be conducted is approximately 50% except switching control of the two switching elements positioned on one side between the upper side of the first and second arms and the lower side of the first and second arms of the secondary side converter, and third output power output from the secondary side converter is adjusted by changing the ON-duty of the two switching elements positioned on one side between the upper side of the first and second arms and the lower side of the first and second arms of the secondary side converter.

6. The DC/DC converter according to claim 5, wherein
the second control is directly switched to the third control to switch the power being output from the secondary side converter from the second output power to the third output power.

7. The DC/DC converter according to claim 6, wherein
the second control is directly switched to the third control in a case where the shift of phase reaches approximately 90 degrees in the second control.

8. A DC/DC converter comprising: a primary side converter that has a primary side reactor, plural primary side semiconductor switching elements, and plural primary side capacitors which are respectively connected in parallel with the plural primary side semiconductor switching elements; a transformer that has a primary winding and a secondary winding; a secondary side converter that has a secondary side reactor, plural secondary side semiconductor switching elements, and plural secondary side capacitors which are respectively connected in parallel with the plural secondary side semiconductor switching elements; and a control unit that controls the plural primary side semiconductor switching elements and the plural secondary side semiconductor switching elements, wherein the primary side reactor is connected with the primary winding and/or is leakage inductance of the primary winding, the secondary side reactor is connected with the secondary winding and/or is leakage inductance of the secondary winding, the primary side converter and the secondary side converter each have a full bridge circuit, in a case where the control unit performs first control in which first output power is caused to be output from the secondary side converter, the control unit performs switching control of the primary side semiconductor switching element positioned on an upper side of a first arm of the primary side converter and the primary side semiconductor switching element positioned on a lower side of a second arm of the primary side converter such that turning ON periods are matched, performs switching control of the primary side semiconductor switching element positioned on a lower side of the first arm of the primary side converter and the primary side semiconductor switching element positioned on an upper side of the second arm of the primary side converter such that turning ON periods are matched, does not perform switching control of two switching elements positioned on one side between an upper side of first and second arms and a lower side of the first and second arms of the secondary side converter, performs switching control of one of the two secondary side semiconductor switching elements positioned on other side between the upper side of the first and second arms and the lower side of the first and second arms of the secondary side converter such that a turning ON period matches the turning ON periods of the primary side semiconductor switching element positioned on the upper side of the first arm of the primary side converter and the primary side semiconductor switching element positioned on the lower side of the second arm of the primary side converter, and performs switching control of the other of the two secondary side semiconductor switching elements positioned on the other side between the upper side of the first and second arms and the lower side of the first and second arms of the secondary side converter such that a turning ON period matches the turning ON periods of the primary side semiconductor switching element positioned on the lower side of the first arm of the primary side converter and the primary side semiconductor switching element positioned on the upper side of the second arm of the primary side converter, the primary side semiconductor switching element positioned on the upper side of the first arm of the primary side converter is switched, at a prescribed phase difference, from the primary side semiconductor switching element positioned on the lower side of the first arm of the primary side converter, the prescribed phase difference is a shift of an angle, which corresponds to approximately ¼ of a reciprocal of a resonance frequency, from 180 degrees, the resonance frequency is defined by the primary side reactor and the primary side capacitors, first output power output from the secondary side converter is adjusted by changing ON-duty of each piece of switching control to be conducted, in a case where the control unit performs second control, the control unit performs switching control of the primary side semiconductor switching element positioned on the upper side of the first arm of the primary side converter and the primary side semiconductor switching element positioned on the lower side of the second arm of the primary side converter such that turning ON periods are matched, performs switching control of the primary side semiconductor switching element positioned on the lower side of the first arm of the primary side converter and the primary side semiconductor switching element positioned on the upper side of the second arm of the primary side converter such that turning ON periods are matched, does not perform switching control of the two switching elements positioned on one side between the upper side of the first and second arms and the lower side of the first and second arms of the secondary side converter, performs switching control of the two secondary side semiconductor switching elements positioned on the other side between the upper side of the first and second arms and the lower side of the first and second arms of the secondary side converter such that phases of turning ON periods are shifted from phases of the turning ON periods of four primary side semiconductor switching elements of the primary side converter, and adjusts second output power output from the secondary side converter by the shifts of phase while the ON-duty of each piece of switching control to be conducted is approximately 50%, and the control unit simultaneously performs a decrease in the prescribed phase difference and an increase in the shift of phase in a case where the control unit performs switching from the first control to the second control.

9. The DC/DC converter according to claim 8, wherein the first control is directly switched to the second control in a case where the ON-duty of each piece of switching control conducted in the first control reaches approximately 50%.

\* \* \* \* \*